US011561616B2

(12) United States Patent
Forsland

(10) Patent No.: US 11,561,616 B2
(45) **Date of Patent: *Jan. 24, 2023**

(54) NONVERBAL MULTI-INPUT AND FEEDBACK DEVICES FOR USER INTENDED COMPUTER CONTROL AND COMMUNICATION OF TEXT, GRAPHICS AND AUDIO

(71) Applicant: Cognixion, Santa Barbara, CA (US)

(72) Inventor: Andreas Forsland, Santa Barbara, CA (US)

(73) Assignee: Cognixion Corporation, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,541

(22) Filed: Dec. 23, 2021

(65) Prior Publication Data

US 2022/0129072 A1 Apr. 28, 2022

Related U.S. Application Data

(63) Continuation of application No. 17/141,162, filed on Jan. 4, 2021, now Pat. No. 11,237,635, which is a continuation-in-part of application No. 16/749,892, filed on Jan. 22, 2020, and a continuation-in-part of application No. 15/929,085, filed on Jan. 9, 2019, now Pat. No. 10,990,175, and a continuation-in-part of application No. 15/498,158, filed on Apr. 26, 2017, now abandoned.

(60) Provisional application No. 62/704,048, filed on Jan. 22, 2019, provisional application No. 62/752,133, filed on Oct. 29, 2018.

(51) Int. Cl.
*G06F 3/01* (2006.01)
*G06F 3/16* (2006.01)
*G10L 15/22* (2006.01)
*G06N 20/00* (2019.01)

(52) U.S. Cl.
CPC ............. *G06F 3/015* (2013.01); *G06F 3/013* (2013.01); *G06F 3/017* (2013.01); *G06F 3/167* (2013.01); *G06N 20/00* (2019.01); *G10L 15/22* (2013.01); *G10L 2015/223* (2013.01)

(58) Field of Classification Search
None
See application file for complete search history.

(56) References Cited

U.S. PATENT DOCUMENTS 5,252,951 A 10/1993 Tannenbaum
5,659,764 A 8/1997 Sakiyama
5,777,614 A 7/1998 Ando
(Continued)

*Primary Examiner* — Nicholas J Lee
(74) *Attorney, Agent, or Firm* — Socal IP Law Group LLP; Angelo Gaz

(57) ABSTRACT

There is disclosed devices, systems and methods for non-verbal multi-input and feedback devices for user intended computer control and communication of text, graphics and audio. The system comprises sensory devices comprising sensors to detect a user inputting gestures on sensor interfaces, a cloud system comprising a processor, for retrieving the inputted gestures detected by the sensor on the sensory device, comparing the inputted gestures to gestures stored in databases on the cloud system, identifying at least a text, graphics and/or speech command comprising a word that corresponds to the inputted gesture; showing the command to the user; and transmitting the command to another device.

20 Claims, 27 Drawing Sheets
(9 of 27 Drawing Sheet(s) Filed in Color)

(56) References Cited

U.S. PATENT DOCUMENTS 6,154,758 A 11/2000 Chiang
6,243,683 B1 6/2001 Peters
6,327,566 B1 12/2001 Vanbuskirk
6,801,897 B2 10/2004 Kist
7,039,676 B1 5/2006 Day
7,447,635 B1 11/2008 Konopka
7,565,295 B1 7/2009 Hernandez-Rebollar
7,809,550 B1 10/2010 Barrows
8,175,728 B2 5/2012 Weinberg et al.
8,335,694 B2 12/2012 Reiner
8,676,175 B2 3/2014 Cheng et al.
8,745,541 B2 6/2014 Wilson
8,793,137 B1 7/2014 Roy
8,854,433 B1 10/2014 Rafii
9,052,817 B2 6/2015 Hotelling
9,069,386 B2 6/2015 Ajika
9,165,159 B1 10/2015 McDonnell
9,223,537 B2 12/2015 Brown
9,280,229 B2 3/2016 Duffield
9,280,366 B2 3/2016 Kamal
9,304,593 B2 4/2016 Cohen
9,477,642 B2 10/2016 Decker et al.
9,489,051 B2 11/2016 Mankowski et al.
9,489,081 B2 11/2016 Anzures et al.
9,495,128 B1 11/2016 Ledet
9,524,272 B2 12/2016 Decker et al.
9,529,440 B2 12/2016 Piemonte et al.
9,582,246 B2 2/2017 Klein et al.
9,600,169 B2 3/2017 de Sa
9,606,647 B1 3/2017 Spencer-Harper
9,710,657 B1 7/2017 Kakkar
9,830,311 B2 11/2017 Zhai
10,013,601 B2 7/2018 Ebersman
10,025,776 B1 7/2018 Sjoberg
10,158,609 B2 12/2018 Lim
10,210,002 B2 2/2019 Zheng
10,311,144 B2 6/2019 Bellegarda
2003/0055644 A1 3/2003 Johnston
2004/0005092 A1 1/2004 Tomasi
2004/0037540 A1 2/2004 Frohlich
2004/0191744 A1 9/2004 Guirguis
2005/0038663 A1 2/2005 Brotz
2006/0107238 A1 5/2006 Gold
2008/0104547 A1 5/2008 Morita et al.
2008/0154604 A1 6/2008 Sathish
2010/0050134 A1 2/2010 Clarkson
2010/0123724 A1 5/2010 Moore
2010/0179864 A1 7/2010 Feldman
2011/0043662 A1 2/2011 Kim
2011/0050594 A1 3/2011 Kim
2011/0302538 A1 12/2011 Vennelakanti
2011/0313768 A1 12/2011 Klein
2012/0035934 A1 2/2012 Cunningham
2012/0038550 A1 2/2012 Lemmey
2012/0162350 A1 6/2012 Lee
2012/0182288 A1 7/2012 Williams
2012/0268294 A1 10/2012 Michaelis
2012/0327009 A1 12/2012 Fleizach
2013/0041654 A1 2/2013 Walker
2013/0074014 A1 3/2013 Ouyang
2013/0144629 A1 6/2013 Johnston
2013/0147933 A1 6/2013 Kulas
2013/0257781 A1 10/2013 Phulwani
2013/0259238 A1 10/2013 Xiang
2013/0285922 A1 10/2013 Alberth, Jr.
2013/0339850 A1 12/2013 Hardi
2014/0026101 A1 1/2014 Pallakoff
2014/0067397 A1 3/2014 Radebaugh
2014/0075286 A1 3/2014 Harada
2014/0143683 A1 5/2014 Underwood
2014/0149987 A1 5/2014 Barillari
2014/0171036 A1 6/2014 Simmons
2014/0201024 A1 7/2014 Collier
2014/0234809 A1 8/2014 Colvard
2014/0267094 A1 9/2014 Hwang
2014/0267543 A1 9/2014 Kerger
2014/0278368 A1 9/2014 Skory
2014/0303960 A1 10/2014 Orsini
2014/0325360 A1 10/2014 Jung
2014/0330951 A1 11/2014 Sukoff
2014/0342667 A1 11/2014 Aarnio
2015/0006172 A1 1/2015 Alameh
2015/0022328 A1 1/2015 Choudhury
2015/0033126 A1 1/2015 Shin
2015/0065182 A1 3/2015 Adams
2015/0102903 A1 4/2015 Wilkinson
2015/0109193 A1 4/2015 Sly
2015/0169169 A1 6/2015 Andersson
2015/0199320 A1 7/2015 Ho
2015/0212676 A1 7/2015 Khare
2015/0220774 A1 8/2015 Ebersman
2015/0293996 A1 10/2015 Liu
2015/0302851 A1 10/2015 Talwar
2015/0363001 A1 12/2015 Malzbender
2016/0055232 A1 2/2016 Yang
2016/0062540 A1 3/2016 Yang
2016/0109954 A1 4/2016 Harris
2016/0117147 A1 4/2016 Zambetti
2016/0179908 A1 6/2016 Johnston
2016/0234551 A1 8/2016 Allegretti
2016/0242623 A1 8/2016 Pasini
2016/0246929 A1 8/2016 Zenati
2016/0277903 A1 9/2016 Poosala
2016/0292217 A1 10/2016 Sinha
2017/0060850 A1 3/2017 Lewis
2017/0083586 A1 3/2017 Huang
2017/0098122 A1 4/2017 el Kaliouby
2017/0127129 A1 5/2017 Ivanov
2017/0140563 A1 5/2017 No
2017/0263248 A1 9/2017 Gruber
2017/0336926 A1 11/2017 Chaudhri
2018/0130459 A1 5/2018 Paradiso
2018/0133900 A1 5/2018 Breazeal
2018/0330732 A1 11/2018 Dasgupta
2018/0336891 A1 11/2018 Sun
2018/0343024 A1 11/2018 Sahebjavaher
2019/0005021 A1 1/2019 Miller
2019/0005024 A1 1/2019 Somech
2019/0007732 A1 1/2019 Havinal
2020/0193965 A1 6/2020 Cordell ©2017, Cognixion ©2017, Cognixion ©2017, Cognixion ©2017, Cognixion ©2017, Cognixion ©2017, Cognixion ©2017, Cognixion ©2017, Cognixion ©2017, Cognixion ©2017, Cognixion ©2017, Cognixion ©2017, Cognixion ©2017, Cognixion

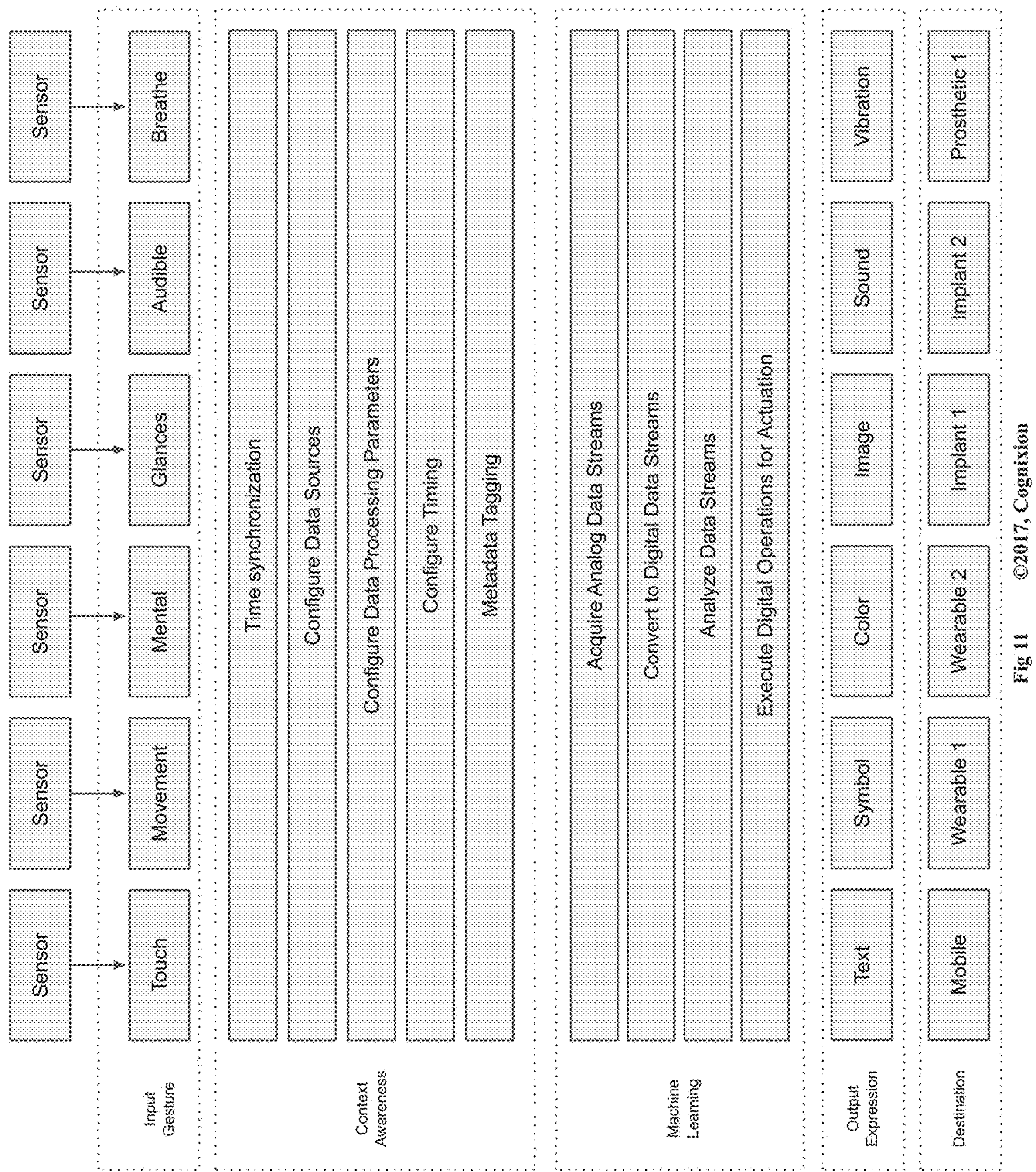
Fig 11 ©2017, Cognixion

| Term | [0077 ] | [0086 ] | [0083 ] | [0087 ] | [0002 ] | [0081 ] | [00 ] | [0080] |
|---|---|---|---|---|---|---|---|---|
| I/O examples | Tap tracking | Swipe tracking | Breath tracking | Head tracking | Face tracking | Eye tracking | Peripheral neuron tracking | Central neuron tracking |
| Timer | μs - Ms | μs - Ms | μs - Ms | μs - Ms | μs - Ms | μs - Ms | μs - Ms | μs - Ms |
| Sensor | Mechanical switch or Capacitive | Capacitive | Air pressure sensor | MEMS (Micro-Electro Mechanical System) | Camera | IR (Infrared) light | EMG (ElectroMyoGraphy) | EEG (ElectroEncephaloGram) |
| Method | linear | linear | linear | complex | complex | complex | complex | complex |
| State changes | On/Hold/Off | On/Hold/Movement/Pressure/Off | On/Increase/Hold/Decrease/Off | Compare 3D axial position (X/Y/Z) to an established steady state (0/0/0) position | Facial feature mapping and shape transforms of the map | Either same as face tracking but limited to eye region and eyeball surface, OR reflectometry of IR light reflected back from within the pupil | Monitoring electrical changes of motor neurons in the muscles to detect intention to contract or relax - can be low or high resolution | Monitoring electrical changes of neuronal activity in the brain to detect a wide range of intentions from arousal and attention to direct response to stimulation - can be low or high resolution |
| Device | Button or Capacitive material | 2-dimensional capacitive touch screen (tablet) | Sip & Puff straw with pressure sensor | VR headset with Accelerometer/Gyroscope | Smartphone with IR projector and camera | Smartphone with IR projector and camera | EMG armband or other skin adhered electrodes | BCI (Brain Computer Interface) with electrodes |
| Gesture example | ...---... (SOS taps) | Double tap, then swipe diagonally up and to the right | Three strong puffs of exhaled air like blowing a whistle | Rapid chaotic movement plus taps, or move head pointer towards an object and dwell on until selected | Gaze at an object, then smile, blink or raise an eyebrow | Gaze dwell fixating on a "help" icon or spell help on a virtual keyboard | Clinched Grip for >2 sec - physically or mental imagery such as a phantom limb for someone with paralysis or amputation | Fast blinks while grinding teeth, or by fixating visual or audible attention towards a specific stimulation frequency (audio or visually evoked potentials) |
| Default meaning | Help | Help | Help | Help | Help | Help | Help | Help |
| Software | App running on a device | App running on a device | App running on a device | App running on a device | App running on a device | App running on a device | App running on a device | App running on a device. |
| Processing | Mapping Gesture to User's Library of Commands | Mapping Gesture to User's Library of Commands | Mapping Gesture to User's Library of Commands | Mapping Gesture to User's Library of Commands | Mapping Gesture to User's Library of Commands | Mapping Gesture to User's Library of Commands | Mapping Gesture to User's Library of Commands | Mapping Gesture to User's Library of Commands |
| Match Yes | Execute command to communicate "Help" aloud | Execute command to communicate "Help" aloud | Execute command to communicate "Help" aloud | Execute command to communicate "Help" aloud | Execute command to communicate "Help" aloud | Execute command to communicate "Help" aloud | Execute command to communicate "Help" aloud | Execute command to communicate "Help" aloud |
| Metadata | Location (at home, away from home) | Location (at home, away from home) | Location (at home, away from home) | Location (at home, away from home) | Location (at home, away from home) | Location (at home, away from home) | Location (at home, away from home) | Location (at home, away from home) |
| Enriched Action | At home = speak aloud; Away = send text message to caregiver with GPS coordinates | At home = speak aloud; Away = send text message to caregiver with GPS coordinates | At home = speak aloud; Away = send text message to caregiver with GPS coordinates | At home = speak aloud; Away = send text message to caregiver with GPS coordinates | At home = speak aloud; Away = send text message to caregiver with GPS coordinates | At home = speak aloud; Away = send text message to caregiver with GPS coordinates | At home = speak aloud; Away = send text message to caregiver with GPS coordinates | At home = speak aloud; Away = send text message to caregiver with GPS coordinates |

©2017, Cognixion

©2017, Cognixion

©2017, Cognixion

Fig 15 ©2017, Cognixion

Fig 16 ©2017, Cognixion

©2017, Cognixion

Fig 18 ©2017, Cognixion

Closed Loop Biosignal Data Flow

1900

©2017, Cognixion

Fig 20 ©2017, Cognixion

Fig 21 ©2017, Cognixion

2100

Cloud Processing

Integrated Virtual AI assistant and web services

2200

©2017, Cognixion

System

NONVERBAL MULTI-INPUT AND FEEDBACK DEVICES FOR USER INTENDED COMPUTER CONTROL AND COMMUNICATION OF TEXT, GRAPHICS AND AUDIO

RELATED APPLICATION INFORMATION

This application is continuation of copending U.S. application Ser. No. 17/141,162 titled NONVERBAL MULTI-INPUT AND FEEDBACK DEVICES FOR USER INTENDED COMPUTER CONTROL AND COMMUNICATION OF TEXT, GRAPHICS AND AUDIO, filed Jan. 4, 2021, which is a continuation-in-part of the following applications:

U.S. patent application Ser. No. 15/498,158, filed Apr. 26, 2017, entitled "Gesture Recognition Communication System";

U.S. patent application Ser. No. 16/749,892, filed Jan. 22, 2020, entitled "CONTEXT AWARE DUAL DISPLAY TO AUGMENT REALITY," which claims priority from Provisional application No. 62/704,048, filed on Jan. 22, 2019;

U.S. patent application Ser. No. 15/929,085, filed Jan. 9, 2019, entitled "BRAIN COMPUTER INTERFACE FOR AUGMENTED REALITY" which claims priority from Provisional application No. 62/752,133, filed on Oct. 29, 2018;

the contents all of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to nonverbal multi-input and feedback devices for user intended computer control and communication of text, graphics and audio.

Description of the Related Art

Hundreds of millions of people around the world use body language to communicate, and billions of people have difficulty interpreting their needs.

Advancements in technology have allowed individuals with speech disabilities to use technical devices to communicate. Smart devices allow individuals ease of interacting with devices by simply touching a screen using a finger, stylus, or similar apparatus.

However, while technology has advanced to allow ease of interaction using touchscreens, individuals with speech disabilities still face challenges communicating with others using spoken words. Therefore, there is a need for a unified system to allow an individual to communicate with others through spoken word by interacting with a computing device via personalized access methods that are all interoperable with the unified system.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 11 is a block diagram of a single framework for translating diverse sensor inputs into a variety of understandable communication and command outputs.

FIG. 12 is a table showing example input/output (I/O) and associated information for a nonverbal multi-input and feedback device.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Described herein is a gesture recognition communication system and/or nonverbal multi-input and feedback device used to enhance a human's capacity to communicate with people, things and data around them remotely over a network or virtually within similar environments. This system or device will benefit individuals with communication disabilities. In particular, it will benefit nonverbal individuals, allowing them to express their thoughts in the form of spoken language to allow for easier communication with other individuals, providing a variety of sensory input modes that can be adapted to various physical or cognitive disabilities, where individuals can communicate with their hands, eyes, breathe, movement and direct thought patterns. Gesture, as used throughout this patent, may be defined as a 'time-based' analog input to a digital interface, and may include, but not be limited to, time-domain (TD) biometric data from a sensor, motion tracking data from a sensor or camera, direct selection data from a touch sensor, orientation data from a location sensor, and may include the combination of time-based data from multiple sensors.

Description of Apparatus

Figure 1A:
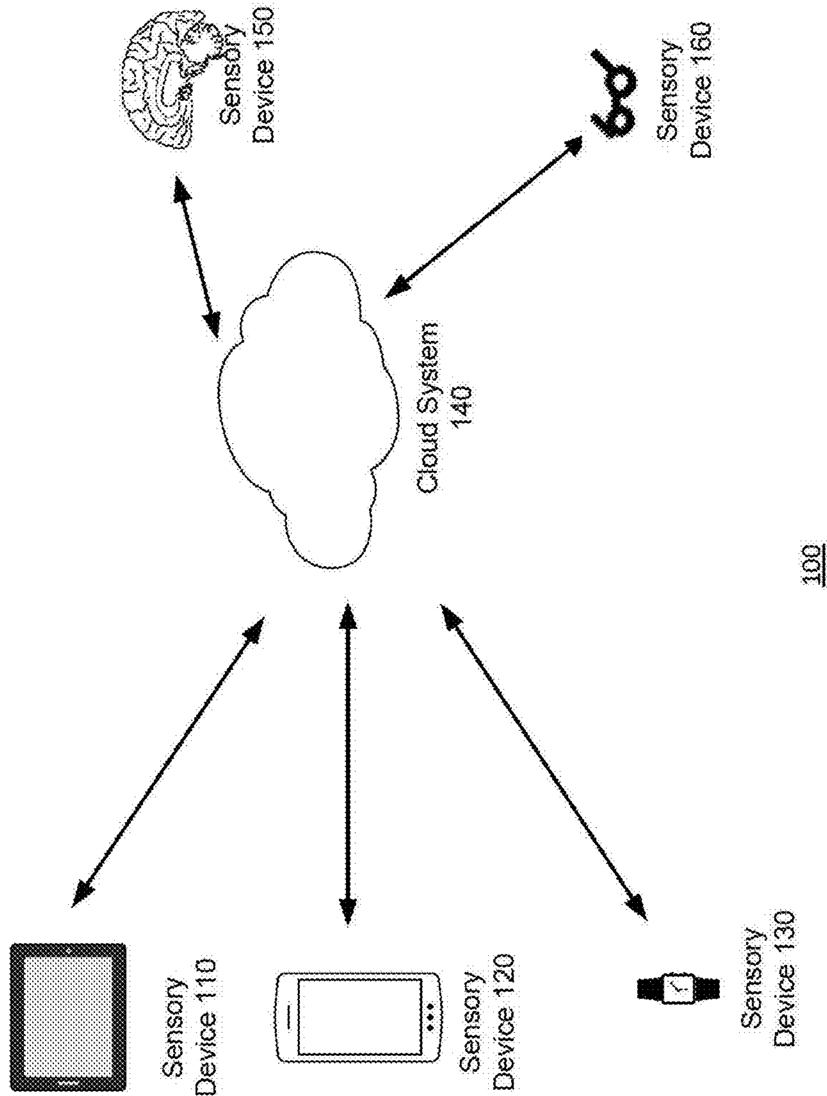
FIG. 1A is a block diagram of a gesture recognition communication system.

Referring now to FIG. 1A, there is shown a block diagram of an environment 100 of a gesture recognition communication system. The environment 100 includes sensory devices 110, 120, 130, 150, and 160, and a cloud system 140. Each of these elements are interconnected via a network (not shown).

The sensory devices 110, 120, 130, 150 and 160, are computing devices (see FIG. 3) that are used by users to translate a user's gesture to an audible, speech command. The sensory devices 110, 120, 130, 150 and 160 sense and receive gesture inputs by the respective user on a sensor interface, such as a touchscreen, or peripheral sensory device used as an accessory to wirelessly control the device. The sensory devices 110, 120, 130, 150 and 160 also generate an audio or visual output which translates the gesture into a communication command. The sensory devices 110, 120, 130, 150 and 160, may be a tablet device, or a smartwatch, or a similar device including a touchscreen, a microphone and a speaker. The touchscreen, microphone and speaker may be independent of or integral to the sensory devices 110, 120, 130. Alternatively, the sensory devices may be screenless devices that do not have a speaker, but contain one or more sensors, such as smart glasses as seen in sensory device 150, or a brain computer interface, as seen in sensory device 160. For purposes of this patent, the term "gesture" means a user's input on a touchscreen of a computing device, using the user's finger, a stylus, or other apparatus including but not limited to wirelessly connected wearable or implantable devices such as a Brain Computer Interface (BCI), FMRI, EEG or implantable brain chips, motion remote gesture sensing controllers, breathing tube sip and puff controllers, electrooculography (EOG) or eye gaze sensing controllers, to trigger a function.

Figure 1B:
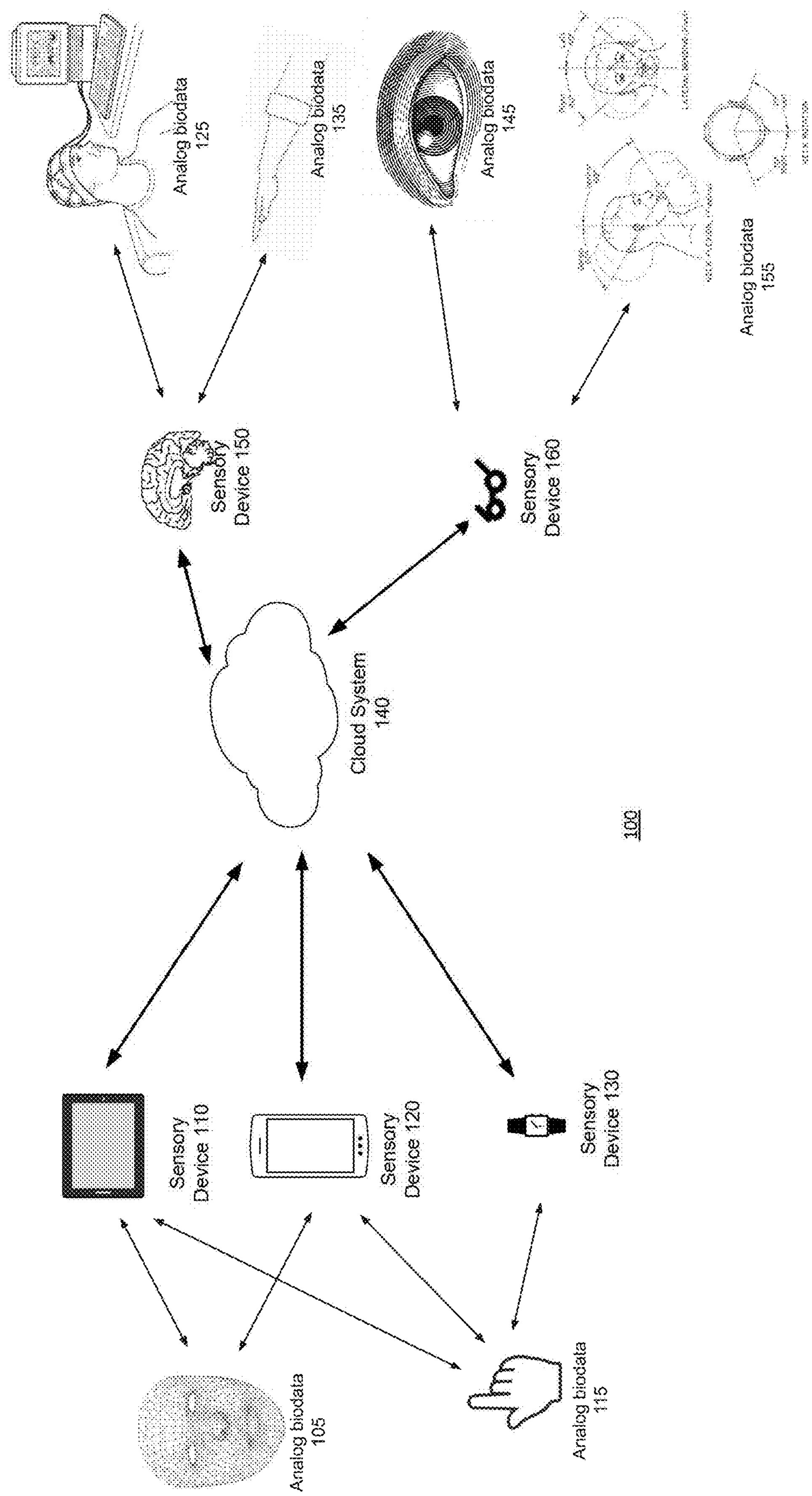
FIG. 1B is a block diagram of nonverbal multi-input and feedback devices for user intended computer control and communication.

FIG. 1B is a block diagram of nonverbal multi-input and feedback devices and inputs for user intended computer control and communication. FIG. 1B adds example sensor inputs to the sensor devices of FIG. 1A, however there may be additional inputs to the sensors. The input examples shown are analog biodata face input 105 to devices 110 and 120; analog biodata touch input 115 to devices 110, 120 and 130; analog biodata brain wave input 125 to device 150; analog biodata brain wave muscle input 135 to device 150; analog biodata eye input 145 to device 160; and analog biodata head movement input 155 to device 160. Input 125 may include inputs to a device 150 that is an implanted sensor. Input 135 may include inputs to a device 150 that is used anywhere the user has a muscle like a leg, foot, tongue, cheek, rectum.

Figure 1C:
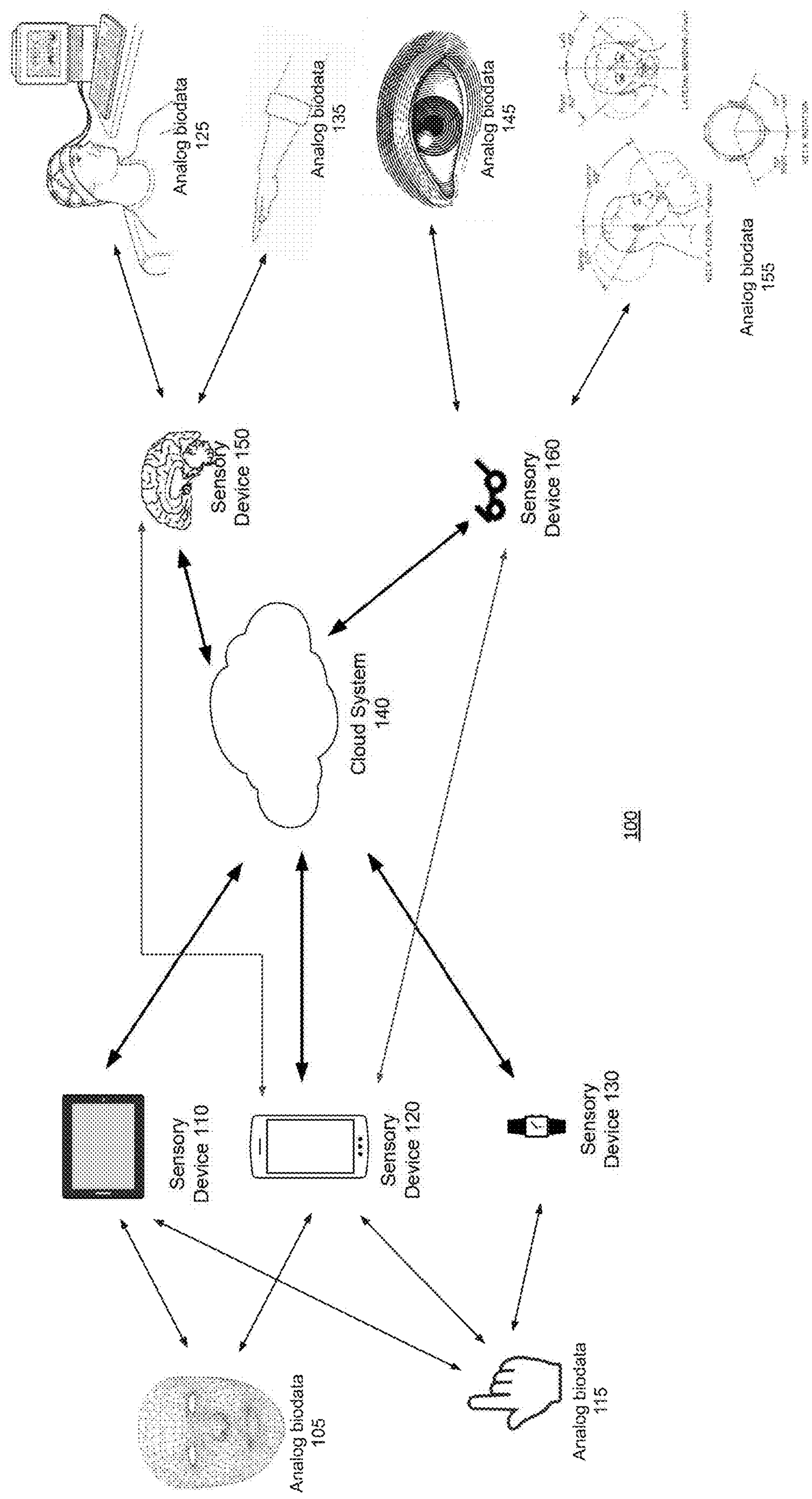
FIG. 1C is a block diagram of nonverbal multi-input and feedback devices and input connections for user intended computer control and communication.

FIG. 1C is a block diagram of nonverbal multi-input and feedback devices and input connections for user intended computer control and communication. FIG. 1C adds example sensor input connections to the inputs and sensor devices of FIG. 1A-B, however there may be additional input connections. The input connection examples shown include a connection between sensory devices 120 and 150 so data received by one of these sensors can be in addition or in the alternative be receive by the other sensor. For example, biodata 125 may be received by both or either of sensors 120 and 150. This is also true for input 105, 115 and 135. The input connection examples shown also include a connection between sensory devices 120 and 160 so data received by one of these sensors can be in addition or in the alternative be receive by the other sensor. For example, biodata 145 may be received by both or either of sensors 120 and 160. This is also true for input 105, 115 and 155.

The cloud system 140 is a computing device (see FIG. 2) that is used to analyze a user's raw input into a sensory device to determine a speech command to execute. The cloud system 140 develops libraries and databases to store a user's gestures and speech commands. The cloud system 140 also includes processes for 1D, 2D, 3D, and 4D gesture recognition algorithms. The cloud system 140 may be made up of more than one physical or logical computing device in one or more locations. The cloud system 140 may include software that analyzes user, network, system data and may adapt itself to newly discovered patterns of use and configuration.

Figure 2:
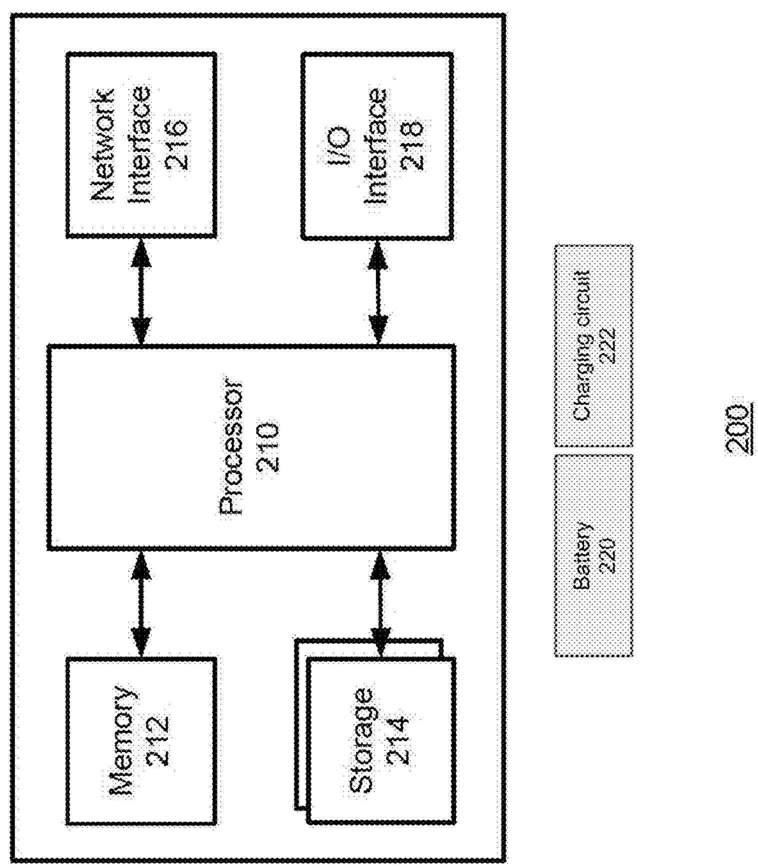
FIG. 2 is a block diagram of a computing device.

Turning now to FIG. 2 there is shown a block diagram of a computing device 200, which can be representative of any of the sensory devices 110, 120, 130, 150 and 160, and the cloud system 140 in FIG. 1. The computing device 200 may be any device with a processor, memory and a storage device that may execute instructions including, but not limited to, a desktop or laptop computer, a server computer, a tablet, a smartphone or other mobile device, wearable computing device or implantable computing device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein. The computing device 200 may run an operating system, including, for example, variations of the Linux, Microsoft Windows and Apple Mac operating systems.

The computing device 200 has a processor 210 coupled to a memory 212, storage 214, a network interface 216 and an I/O interface 218. The processor 210 may be or include one or more microprocessors, field programmable gate arrays (FPGAs), application specific integrated circuits (ASICs), programmable logic devices (PLDs) and programmable logic arrays (PLAs). The computing device 200 may optionally have a battery 220 for powering the device for a usable period of time and charging circuit 222 for charging the battery.

The memory 212 may be or include RAM, ROM, DRAM, SRAM and MRAM, and may include firmware, such as static data or fixed instructions, BIOS, system functions, configuration data, and other routines used during the operation of the computing device 200 and processor 210. The memory 212 also provides a storage area for data and instructions associated with applications and data handled by the processor 210.

The storage 214 provides non-volatile, bulk or long term storage of data or instructions in the computing device 200. The storage 214 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the term storage medium corresponds to the storage 214 and does not include transitory media such as signals or waveforms. In some cases, such as those involving solid state memory devices, the memory 212 and storage 214 may be a single device.

The network interface 216 includes an interface to a network such as the network described in FIG. 1. The network interface 216 may be wired or wireless.

The I/O interface 218 interfaces the processor 210 to peripherals (not shown) such as a graphical display, touchscreen, audio speakers, video cameras, microphones, keyboards and USB devices.

Figure 3:
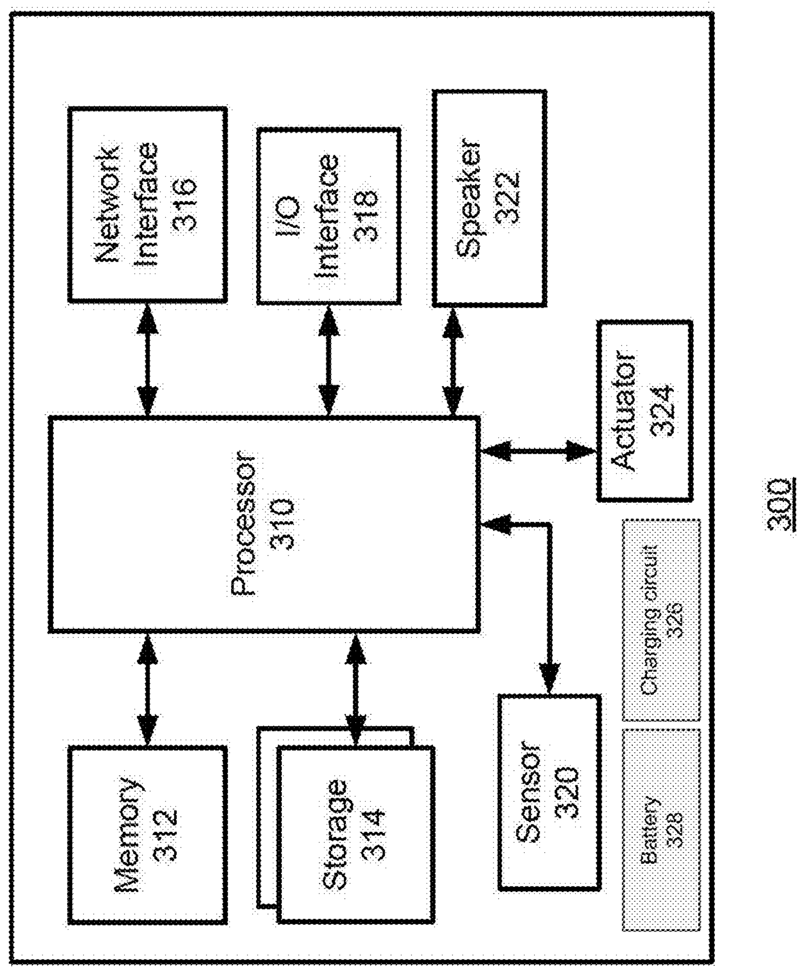
FIG. 3 is a block diagram of a sensory device.

Turning now to FIG. 3 there is shown a block diagram of a sensory device 300, which can be representative of any of the sensory devices 110, 120, 130, 150 and 160, of FIG. 1. The processor 310, memory 312, storage 314, network interface 316 and I/O interface 318 of FIG. 3 serve the same function as the corresponding elements discussed with reference to FIG. 2 above. These will not be discussed further here. The computing device 300 may optionally have a battery 328 for powering the device for a usable period of time and charging circuit 326 for charging the battery. Charging circuit 326 may be used for charging the batteries of multiple sensory devices together. For example, a BCI/AR device, can have a single charging circuit used to charge both the BCI and the AR system which have their own batteries, but since they're two sensory devices combined into a single wearable, charging can be simplified for the user with a single charging circuit.

The sensor 320 can include any sensor designed to capture data. The sensor 320 can be a touch sensor, a camera vision sensor, a proximity sensor, a location sensor, a rotation sensor, a temperature sensor, a gyroscope, an accelerometer. The sensor 320 can also include a biological sensor, an environmental sensor, a brainwave sensor, or an acoustic sensor. The sensory device 300 can include a single sensor or multiple sensors with a combination of various types of sensors.

The speaker 322 can be a wired or wireless speaker integrated into the sensory device 300, or attached to, or wirelessly connected to, the sensory device 300. The speaker 322 allows the sensory device to output the translated gesture into a speech command.

The actuator 324 may provide user feedback to the system. For example, the actuator may be used for physical actuation in the system, such as haptic, sound or lights.

Description of Processes

Figure 4:
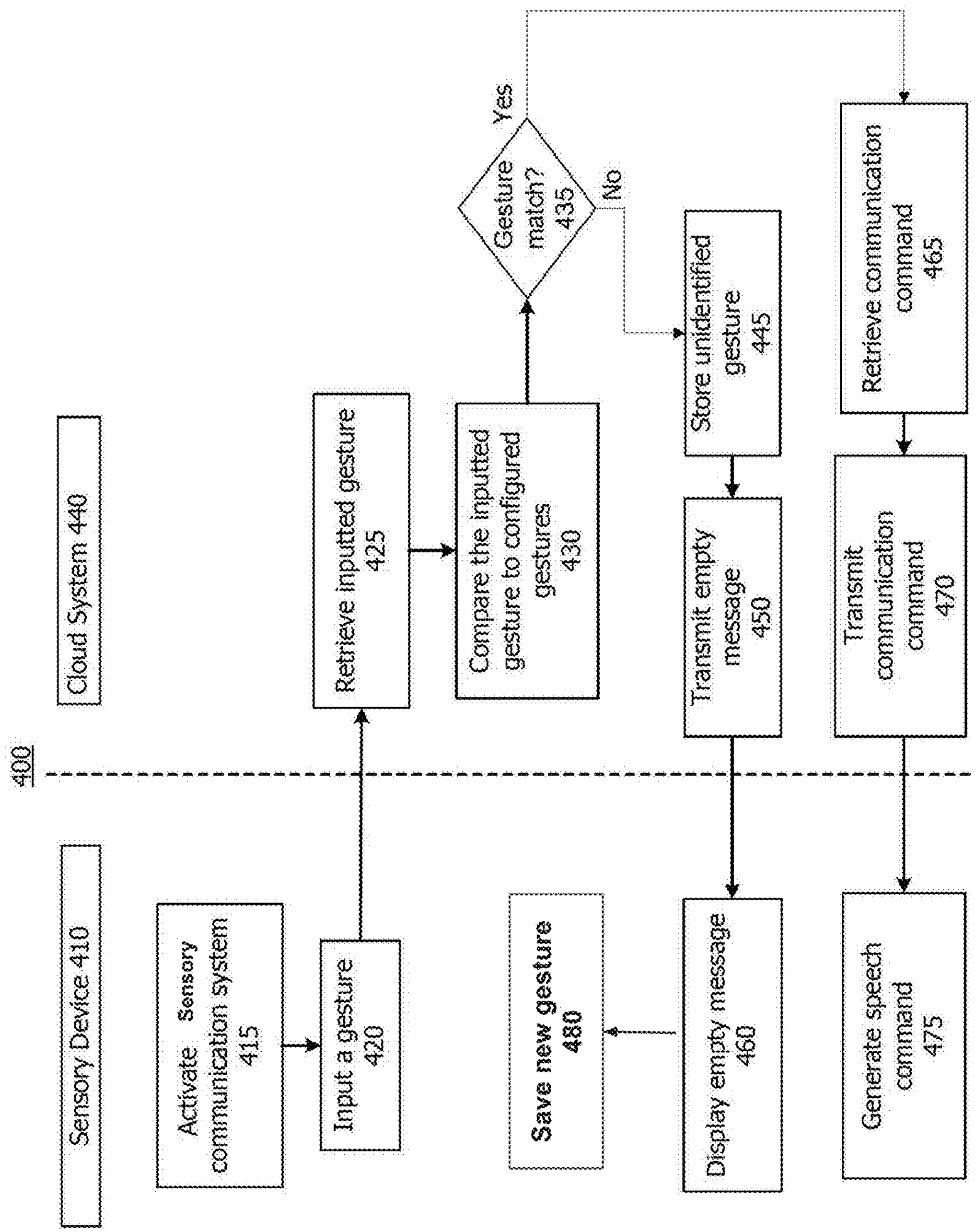
FIG. 4 is a flowchart of using the gesture recognition communication system to generate speech commands and/or of using nonverbal multi-input and feedback devices for user intended computer control and communication.

Referring now to FIG. 4, there is shown a process 400 of using the gesture (or sensory) recognition communication system, such as the system shown in FIG. 1A, to generate speech commands; and/or of using nonverbal multi-input and feedback devices, such as the system shown in FIG. 1B or 1C, for user intended computer control and communication of text, graphics and audio. The process occurs on the sensory device 410, as well as the cloud system 440. While the process includes steps that occur on both the sensory device 410 and the cloud system 440, the process can also be performed locally on just the sensory device 410. In this case, the actions performed by cloud system 440 are performed by the sensory device. Sensory device 410 represents any of sensory devices 110-160. Process 400 should be able to execute; entirely on the sensory/input device (not shown); partially on the sensory/input device and partially in cloud (shown).

The process 400 begins with at 415 with a user activating the gesture or sensory recognition communication system. The activation can occur when a user logs into his account on an app stored on the sensory device 410. After the user has logged into his account, the process proceeds to 420 where the user inputs a gesture. Alternatively, a user can begin using the system without logging into an account.

The gesture can include a single tap on the touchscreen of the sensory device 410. Alternatively, the gesture can include a swipe in a certain direction, such as swipe up, swipe down, swipe southeast, and such. In addition, the gesture can include a letter, or a shape, or an arbitrary design. The user can also input a series of gestures. The sensors on the sensory device 410 capture the gestures inputted and executes all the processes locally on the sensory device or transmits the raw data of the gesture inputted to the cloud system. The inputted gesture may be stored in the storage medium on the sensory device 410, and synchronized to the cloud system 440.

After the user inputs his gesture, the process proceeds to 425, where the gesture is transmitted over a network to the cloud system. The cloud system retrieves the inputted gesture at 425, and then compares the inputted gesture to a gesture database either locally or on the cloud system that stores preconfigured gestures. The cloud system may analyze the raw data of the gesture inputted by determining the pattern, such as the direction of the gesture, or by determining the time spent in one location, such as how long the user pressed down on the sensory device. For example, if the user inputs a swipe up gesture, then the raw data would indicate a continuous movement on the sensor interface of the sensory device. Alternatively, if the user inputted a double tap on the sensor interface, then the raw data would indicate a similar position was pressed for a short period of time. The cloud system would analyze the raw data to interpret the inputted gesture. After the raw data has been interpreted, the cloud system would compare the raw data inputted to a database or library of previously saved gestures stored on the cloud system. The database or library would include previously saved gestures with corresponding communication commands associated with each previously saved gesture. The database or library may be specific to a certain user, thereby allowing one user to customize the gestures to mean particular communication commands of his choice, while another user can use the preconfigured gestures to translate into different communication commands. For example, one user may desire to customize the swipe up gesture to mean, "Yes", while another user may customize the swipe up gesture to mean, "No." Therefore, every user may have a unique gesture database associated with his user account. As noted, in some cases processes 425-470 are performed by the sensor device.

The cloud system 440 determines if there is a gesture match at 435 between the inputted gesture and the stored preconfigured gestures. To determine if there is a gesture match, the cloud system would analyze the inputted gesture, and the raw data associated with the inputted gesture, and lookup the preconfigured gestures stored in the database. If the inputted gesture exists in the database, then the database will retrieve that record stored in the database. The record in the database will include the communication command associated with the inputted gesture. Alternatively, if no communication is associated with a saved gesture, the system may transmit a null or empty message, as seen in 450, which may include data associated with the transmission including but not limited to raw user input data which may be saved in the database.

If the cloud system does not locate a match, meaning the cloud system did not locate a record in the database of preconfigured gestures looking like the inputted gesture, then the process 400 proceeds to 445 where the unidentified gesture is stored in the cloud system 440. The cloud system 440 stores the unidentified gesture in a database to allow the cloud system to improve on the gesture pattern recognition over time. As a user interacts with the gesture or sensory recognition communication system, the system will develop pattern recognition libraries that are based on the user's inputted gestures. For example, one user may press his finger on the sensor interface for 2 seconds to indicate a "long hold" gesture, while another user may press his finger on the sensor interface for 3 seconds to indicate a "long hold". The database may be configured to identify a "long hold" gesture after pressing on the sensor interface for 4 seconds. In this case, both of the users' "long hold" gesture may not be found in the gesture database, because the database was configured with different requirements for the "long hold" gesture. Therefore, over time, as a user continues to press the sensor interface for 2 seconds, the database will update itself and recognize that the user is attempting to input the "long hold" gesture.

Figure 5:
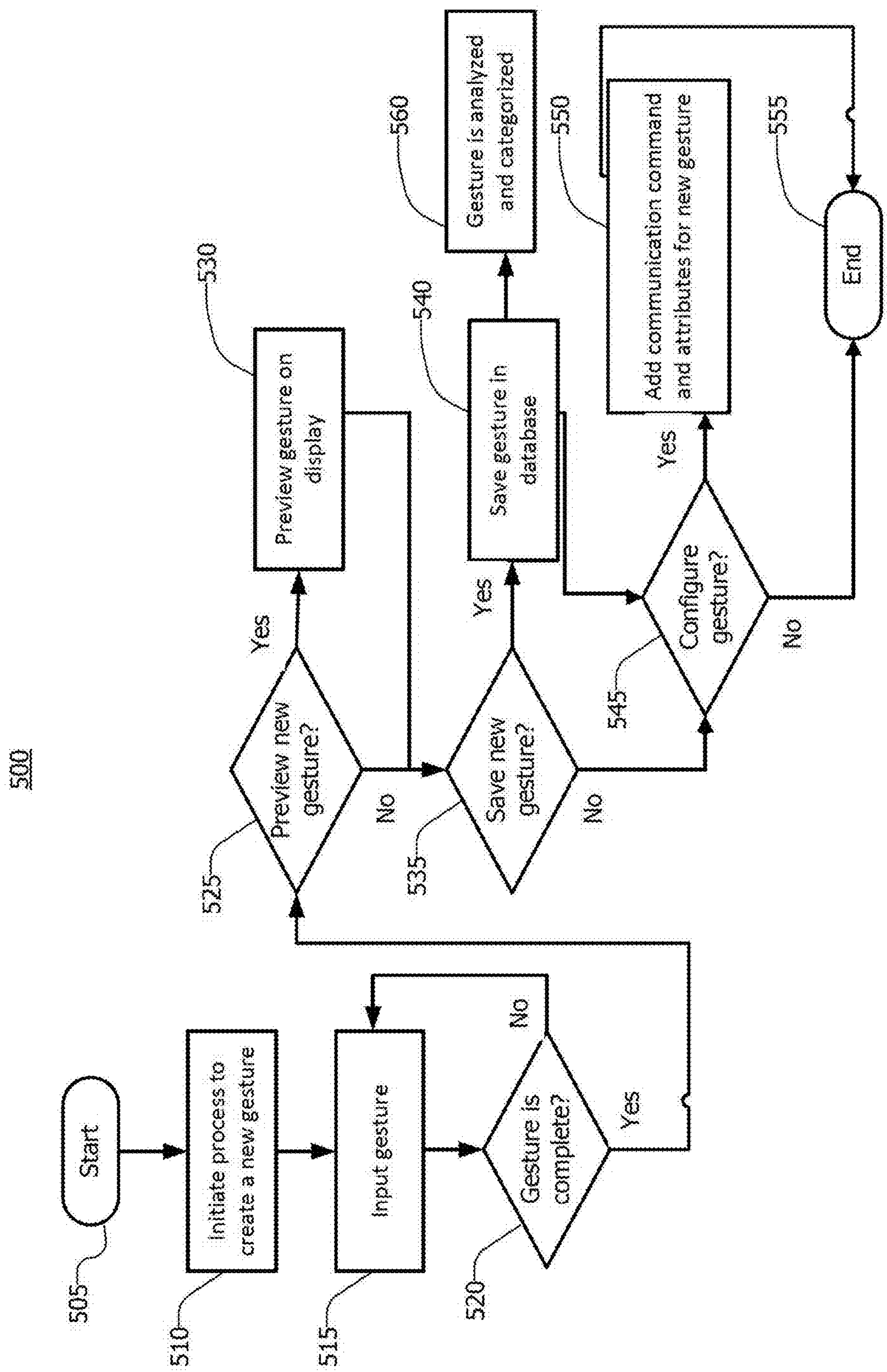
FIG. 5 is a flowchart for configuring a new gesture to be used in the gesture recognition communication system and/or nonverbal multi-input and feedback devices.

After the unidentified gesture is stored, the cloud system transmits an empty message at 450 to the sensory device 410. The sensory device 410 then displays an "empty" message at 460. The "empty" message may be a speech command that says, "The system does not understand that gesture." Alternatively, the message might be an emoji showing that the system did not understand the gesture, or simply delivers an undefined message "_". After 460, the unidentified gesture is saved as a new gesture at 480 based on the system identifying an unmapped gesture+message. A user may map a new 'saved gesture' to a desired communication or control command manually, or the system may map the new gesture to a new communication or command automatically based on machine learning, for future use. Refer to FIG. 5 for the "save new gesture" flow diagram.

Alternatively, if the cloud system did locate a match between the inputted gesture and the stored preconfigured gestures, then the process 400 proceeds to 465 to retrieve the communication command. The communication command is retrieved and identified when the database retrieves the stored record in the database of the gesture. For each gesture stored in the database, there will be a communication command associated with the gesture. The communication command can be a natural language response, such as "Yes" or "No". Alternatively, the communication command can be a graphical image of an object, such as an emoji of a happy face, or other actuation including but not limited to a photograph, a color, animated picture or light pattern, a sound, or a vibration pattern. After the communication command has been identified, the cloud system 440 then transmits the communication command at 470 over the network to the sensory device 410. The sensory device 410 then generates the speech command 475. In addition, the sensory device may display a graphical image, or other actuation described above, if that was what the inputted gesture was to be translated to. If the communication command is a word or phrase, then the sensory device will generate a speech command, in which the speaker on the sensory device will generate the speech saying the words or phrase associated with the gesture. The communication command may also contain contextual data that is appended to or modifies the communication being transmitted. Contextual data may include contact lists, location, time, urgency metadata.

Referring now to FIG. 5, there is shown a process 500 for configuring a new gesture to be used in the gesture (or sensory) recognition communication system, such as the system shown in FIG. 1A; and/or nonverbal multi-input and feedback devices, such as shown in FIG. 1B or 1C. Process 500 can be performed on any of the sensor systems 110-160. Notably, the new gesture and configuring can be responsive to gestures input into one of the sensor systems.

The process 500 begins when a user initiates the new gesture creation process. This can occur when the user selects a new gesture icon that exists on the sensor interface of the sensory device. After the process has been initiated, the user can input a new gesture at 515. The new gesture can be any gesture that is not included in the pre-configured gestures. At 520, the system determines if the new gesture has been completely inputted.

If the gesture has not been completed inputted, then the process returns to 515 to allow the user to complete inputting the new gesture. Alternatively, the user can enter a series of gestures.

If the gesture has been completed inputted, then the process proceeds to 525 where the system asks the user if the user wants to preview the new gesture. If the user does want to preview it, then the new gesture is displayed at 530 for the user to preview. If the user does not want to preview the new gesture, then the system asks the user if the user wants to save the new gesture at 535. If the sensory device 510, is connected to the cloud system, then at 560, it sends the recorded gesture to the cloud system to be analyzed and categorized.

If the user wants to save the new gesture, then the new gesture is saved at 540 in the gesture database stored on the cloud system. The system next determines at 545 if the user wants to configure the new gesture with a communication command. If the user does not want to configure the new gesture at that moment, then the process ends. The user can choose to configure the new gesture at a later time. Alternatively, if the user wants to configure the new gesture, then the process proceeds to 550, where the user adds a communication command to the new gesture. The communication command can be words or phrases in a natural language. Alternatively, the communication command can be a graphical image, or other actuation pattern (such as light, color, sound, vibration). After the communication command has been stored in the gesture database, the process ends.

Figure 6:
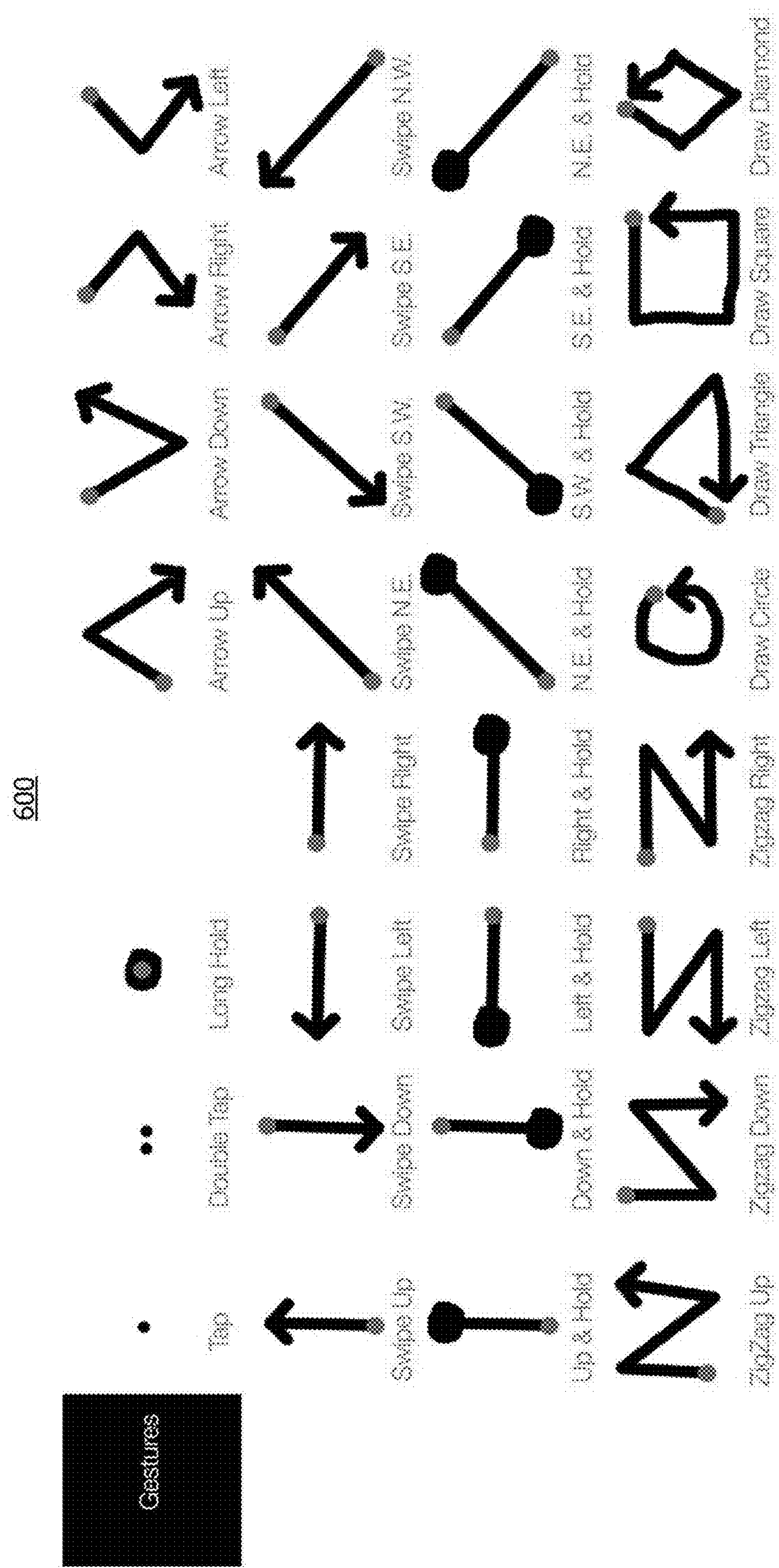
FIG. 6 is a sample of pre-configured gestures that may exist in the system and/or nonverbal multi-input and feedback devices.

Referring to FIG. 6, there is shown a sample 600 of pre-configured gestures that may exist in the gesture recognition communication system, such as the system shown in FIG. 1A; and/or nonverbal multi-input and feedback devices, such as shown in FIG. 1B or 1C. The pre-configured gestures may include a single tap (see red dot), a double tap, a long hold. In addition, the pre-configured gestures may include swipe up, swipe down, swipe left, swipe right, swipe northeast, swipe northwest, swipe southeast, swipe southwest. The pre-configured gestures can also include combinations of taps and swipes, such as the up and hold gesture shown, and can also include letters, numbers, shapes, and any combination of those. The pre-configured gestures shown are some examples for just the touch I/O sensory devices. The pre-configured gestures can also include data on thought, breaths, glances, motion gestures, and similar nonverbal gestures. These physical gestures are not limited to touch or swipe, but could also be used with head/neck movement, face/eye tracking movement, etc. Refer above to a definition of "gesture" as a time based input with a beginning/middle/end. Regarding I/O that are biosignals (EEG, EMG, etc), then the geometric shape of a gesture may not apply. Instead, a gesture may be or include processed time-based frequency neuronal data that is associated with objects to interact with them.

Figure 7A:
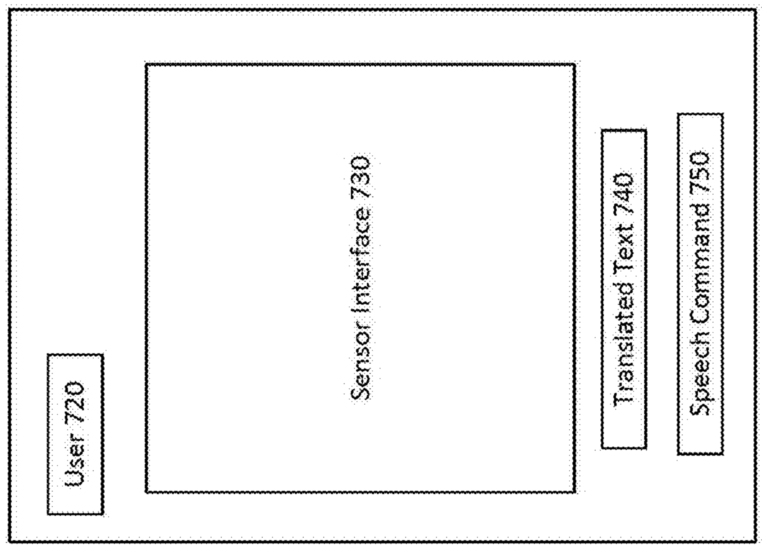
FIG. 7A is a display of a sensory device for a user to input a gesture.

Referring to FIG. 7A, there is shown a display of a sensory device 710, such as sensory device 110 in FIG. 1A. The sensory device may be used by a user to input a gesture. The sensory device 710 may display information about the user at 720. In addition, the sensory device includes a sensor interface 730 for the user to input a gesture. The sensory device 710 also includes translated text at 740. The translated text may display the natural language, or other information attributes associated with the gesture inputted into the sensor interface. If receiving a message from a connected contact across a network, then the sender's message is displayed and spoken aloud as it was configured from the sender, which may also include data about the sender. The sensory device 710 also includes the speech command 750. The speech command 750 is the spoken natural language for the gesture that was inputted by a user. The sensory device may also provide user feedback to the system, including physical actuation elements, such as haptic, lights, or sounds.

Figure 7B:
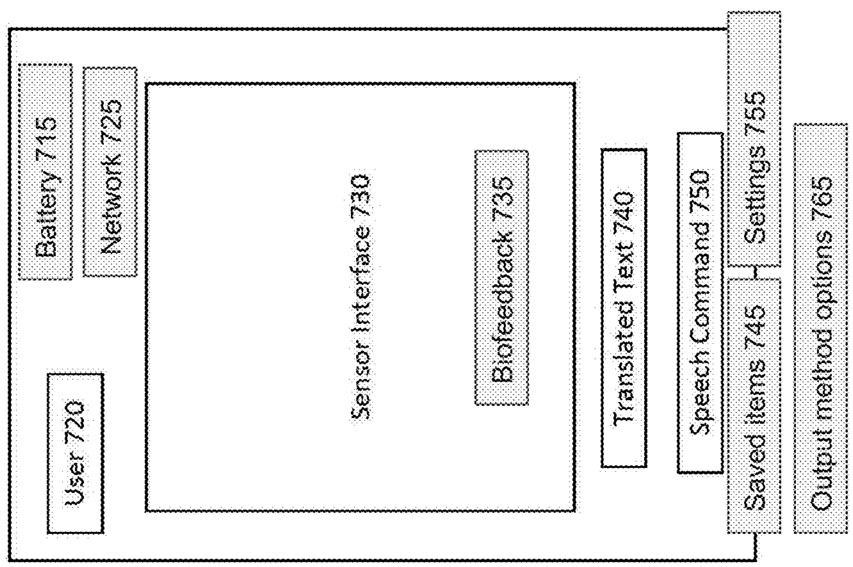
FIG. 7B is a display of a nonverbal multi-input and feedback device for a user to input a gesture.

Referring to FIG. 7B, there is shown a nonverbal multi-input and feedback device 702, such as shown in FIG. 1B or 1C. FIG. 7B adds example features of device 702 to those of device 710, however there may be fewer or more features than those show in device 702 that are added to device 710. The feature examples include optionally battery status 715 for showing the battery power for powering the device for a usable period of time. They also include saved items or phrases 745, such as for saving new gestures 480 input to the sensors to be used to correctly interpreted the nonverbal multi-input for user intended computer control and communication. Next, they include I/O settings 755 to be used by the device to configure the sensors and device to correctly interpreted the nonverbal multi-input for user intended computer control and communication. They also include output method options 765 to select output options be used by the device to output the user intended computer controls and communication of text, graphics and audio to other computing devices. Options 765 may include multiple buttons/methods for output selection (e.g., say it, send it, save it).

The feature examples also include biofeedback 735 for feeding back to the user information (e.g., nonverbal multi-inputs), text, graphics and/or audio so that the user can correctly input data to the sensors that can be interpreted as the user intent for user intended computer control and communication. Biofeedback can be an important and a part of the interface. It may include feedback to the user in response to user inputs to the sensors. The feedback may be visual, auditory and/or haptic. For example, visual may be or include a configurable cursor, or a comet trail after swiping, or a progress bar around an object for dwell time or concentration, or stimulation of the user's visual brain. Auditory feedback may be or include sound effects based on direct interaction with sensory device, time-based progress of interaction such as a rising tone as during concentration or dwell, or system prompts to alert user to take actions, or stimulation of the user's visual brain. Haptic feedback may be or include vibration patterns based on direct interaction with the sensory device, time-based progress of interaction such as different vibration patterns for correct versus incorrect interaction, or system prompts to alert user to take actions, or stimulation of the user's visual brain). Spatial audio and haptics biofeedback may include auditory feedback like sound effects based on direct interaction with sensory device, time-based progress of interaction such as a rising tone as during concentration or dwell, or system prompts to alert user to take actions, stimulation of the user's visual brain, or sounds presented to the user that are spatially placed and can be identified by the user based on how their brain perceives its position (e.g. left, right, close far, front, back, moving from left to right then up). Haptic biofeedback may be or include vibration patterns based on direct interaction with the sensory device, time-based progress of interaction such as different vibration patterns for correct versus incorrect interaction, or system prompts to alert user to take actions, stimulation of the user's visual brain, or haptic vibration patterns presented to the user that are felt or perceived by the brain spatially around their body (e.g. left, right, close, far, strong, weak, front, back, moving from left to right then up)."

The feature examples also include network status 725 for showing the status of a network the device is communicating over such as wireless, wired, WIFI, internet, cell or another network, to send the user intended computer controls and/or communication to other computing devices. The device has the proper equipment for communicating control signals and/or the communication over the network.

Figure 8A:
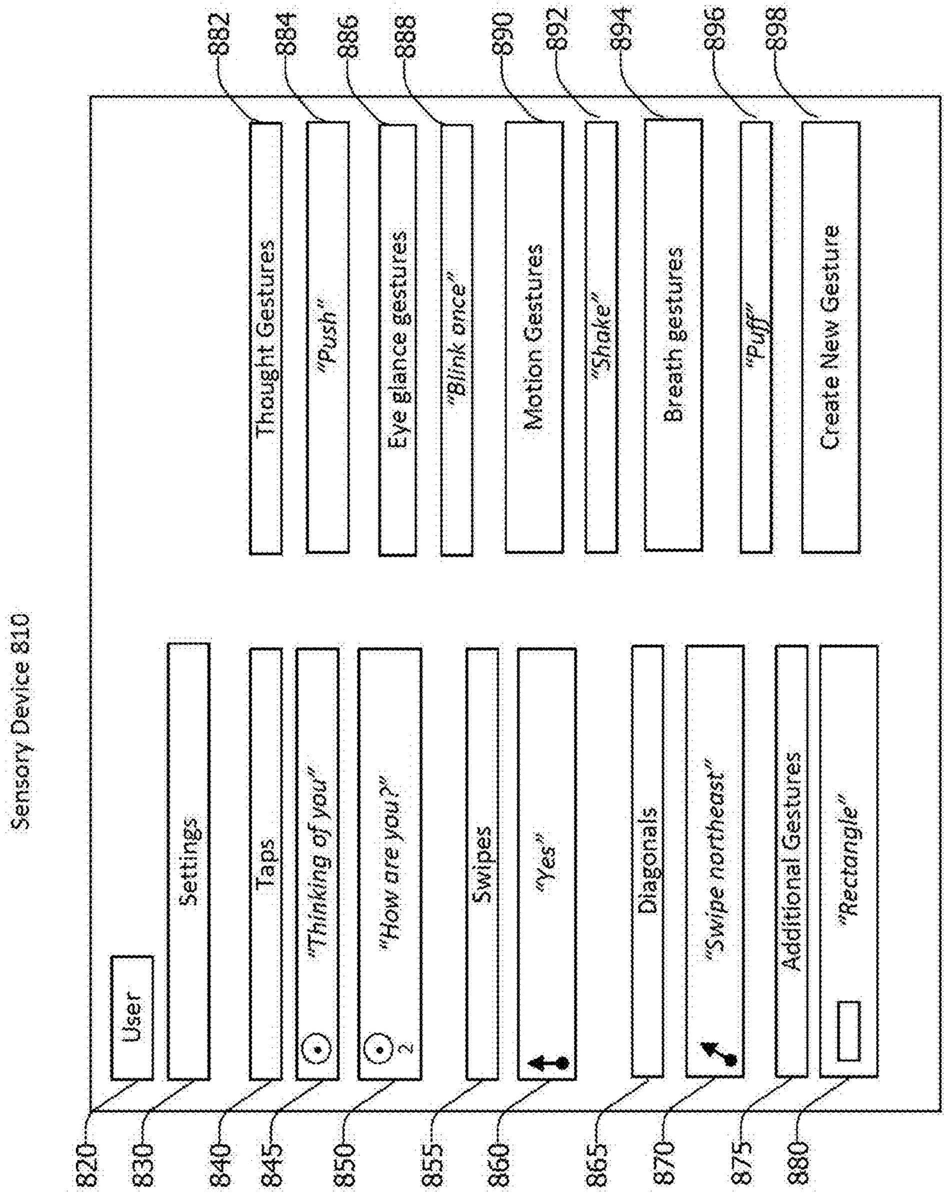
FIG. 8A is a display of a sensory device for a user to access the pre-configured gestures.

Referring to FIG. 8A, there is shown a display of a sensory device 810 for a user to access the pre-configured gestures in the system or device, such as those of FIGS. 1A-C. The sensory device 810 shows a user's pre-configured gestures that are stored in a user's account. The sensory device displays information about the user at 820. The sensory device 810 also displays the settings 830 that are configured for the user 820. The settings 830 include settings such as taps 840, swipes 855, diagonals 865, additional gestures 875, thought gestures 882, eyeglance gestures 886, motion gestures 890, breath gestures 894, and create new gesture 898. The taps 840 can include a single tap 845, a double tap 850, or long hold, or any other taps. Each of the taps may translate into different words, phrases or sentences. For example, a single tap 845, may translate into the words, "Thinking of You." A double tap may translate into the words, "How are you?"

The swipes 855 may include swipe up, swipe down, swipe to the right, swipe to the left. Each of these swipes may translate into different words or phrases. For example, swipe up shown at 860 may mean "Yes", while swipe down might mean "No." Swipe gestures may include multi-touch and time elapsed such as "swipe and hold."

The pre-configured gestures may also include diagonals shown at 865. For example, swipe northeast shown at 870 may mean, "Swipe northeast." In addition, the pre-configured gestures may also include additional gestures shown at 875. For example, shapes, letters, numbers and similar objects may all be included in the pre-configured gestures. A gesture of a rectangle shown at 880 may translate to "Rectangle."

The thought gestures 882 may include various thoughts of a user. For example, a user's thoughts might include the thought of "Push", shown at 884, or "straight". If the user thinks of the word "Push", then the system may speak the word, "Push."

The eye glance gestures 886 may include various eye movements of a user. For example, a user may "blink once", as shown in 888, and that may cause the system to speak the word, "Yes."

The motion gestures 890 may include movements made by a user. For example, a user may shake his head, as shown in 894, and the system may then speak the word, "No."

The breath gestures 894 may include information about a user's breathing pattern. For example, a user may breathe in a "puff" manner, and the system would detect that and may speak the word, "Help."

A user can also create a new gesture at 898. For example, a user may have a touch based pattern, or a thought pattern that has not been previously saved in the system. A user can customize new gestures with the create new gesture option shown at 898.

A user 820 can refer to the setting 830 to determine how each gesture will be translated. If a user added new gestures, as described by the process shown in FIG. 5, then the new gesture and it's translated language will also appear in the list of gestures shown in the settings.

FIG. 8A may show a single display device 810 example to be used by a user to configure a variety of inputs for a variety of sensory devices, such as those of FIGS. 1A-C. Device 810 may provide or represent a 1-to-1 mapping between a single user input and a single output. Also contemplated is an interface to configure a sensory device and/or nonverbal multi-input and feedback device to generally control an entire application like a mouse or keyboard.

Figure 8B:
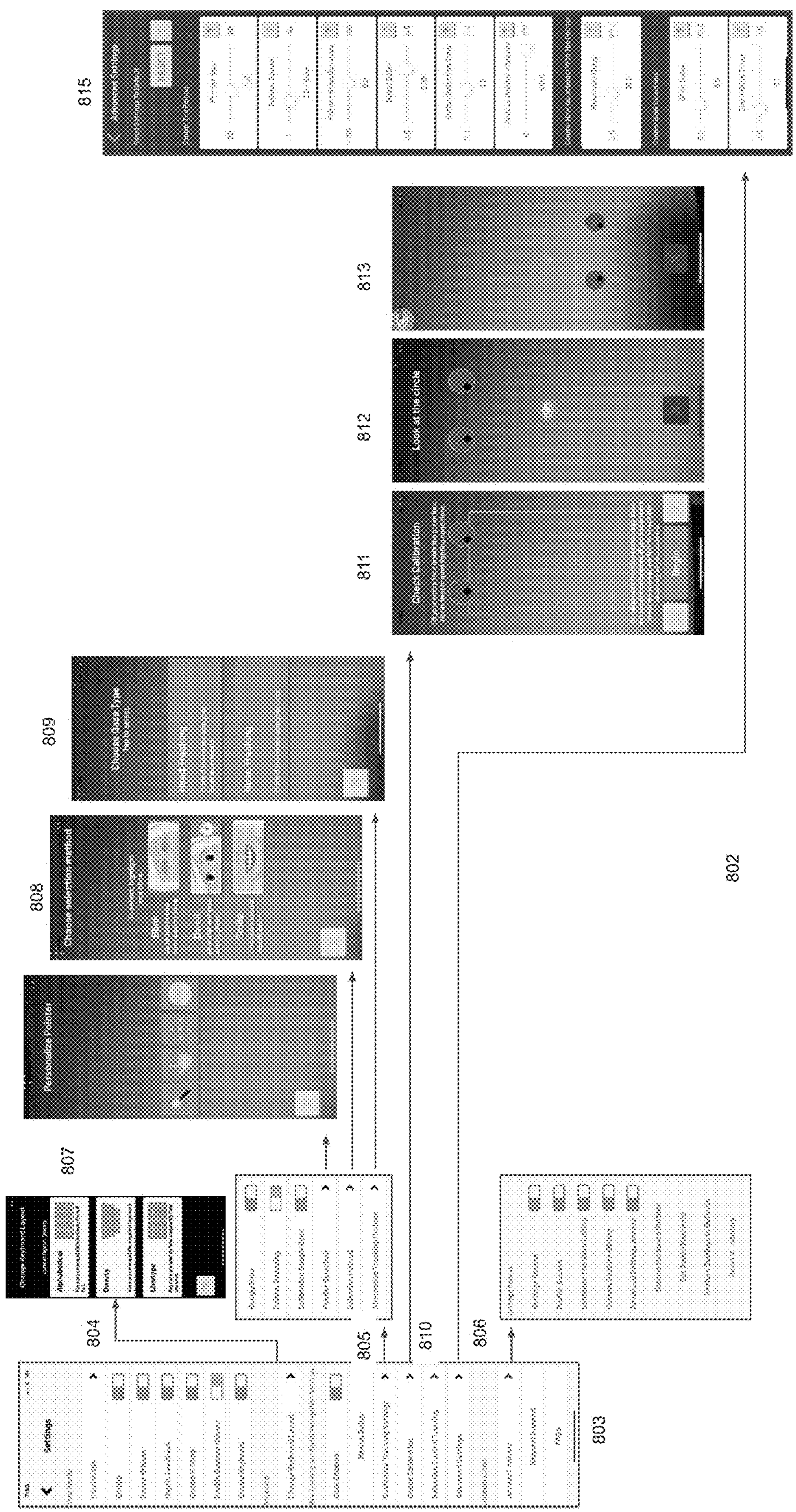
FIG. 8B is a display of a nonverbal multi-input and feedback device for a user to access the pre-configured gestures.

FIG. 8B is a display 802 of a nonverbal multi-input and feedback device for a user to access the pre-configured gestures. Display 802 may be that of a sensory device to personalize various aspects of the sensory I/O of the sensory device to make it more natural to use with the sensory communication system. This example is multi-modal in that it allows settings for both touch interaction plus facial and eye tracking in a single personalization interface or nonverbal multi-input and feedback device. Display 802 shows menus such as a settings menu 803 for selecting to change a keyboard layout 804, to customize tracking settings 805 and to access controls 806. The customize tracking settings 805 menu leads to pointer selection 807, selection method 808 and alternative tracking options (gaze type) 809. There is menu 803 also has check calibration menu 810 leading to calibration menus 811-813 for enabling a user to calibrate their abilities to a sensory device, or calibrate a sensory device to receive gaze type eye inputs (see red eye shapes on screen). The menu 803 also has an advanced setting menu 815. Menu 815 may include advanced I/O settings having the ability to manually, or automatically via the system's machine learning subsystems, adjust a plurality of variables related to the biofeedback and user interface responsiveness to the user's input and output experience. In the case of face, eye, head and neck movement and neural sensory devices, these variables may include adjusting Pointer size, Pointer speed, Pointer selection area, Hover delay timing, Button selection time window, tracking velocity and smoothing, vibration offsets, Response delay, Blink/Smile or other facial or biometric selection delay, Short blink timer to reduce false positive selections which may apply to other biosignal sensory device inputs. The advanced settings may be available initially with default settings, and individually be adjusted to perfect the user's preferences. These settings may be saved locally on the sensory device and/or synchronized to the cloud for future use, retrieval on other devices, or contributing data sets for machine learning and new optimized models and software creations that may be downloaded to the respective sensory device. These settings can be reset individually or collectively.

Figure 9:
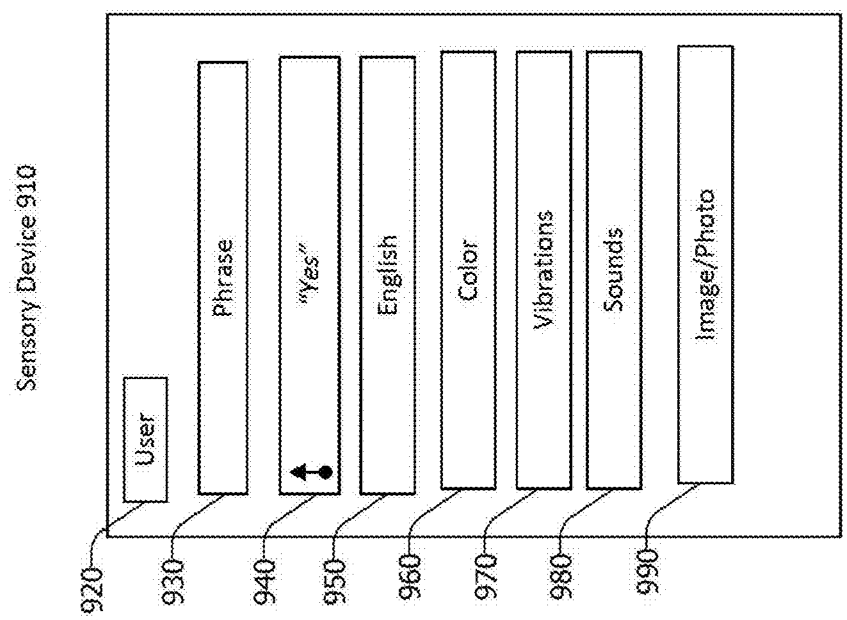
FIG. 9 is a display of a sensory device or a nonverbal multi-input and feedback device for a user to customize a gesture.

Referring to FIG. 9, there is shown a display of a sensory device 910 for a user 920 to customize a gesture, such as sensory and/or a nonverbal multi-input and feedback device of FIGS. 1A-C. The system or device comes pre-configured with gestures and translated phrases. A user can choose to add new gestures to the system, or modify the phrase that corresponds to the pre-configured gestures. For example, a user may wish to change the meaning of the swipe up gesture to mean, "Happy." To modify the phrase, the user will select the swipe up gesture shown in 940. Where it says, "Yes", the user 920 can delete that, and insert, "Happy." The system then updates the gesture database such that whenever the user 920 swipes up, the system says, "Happy." In addition, the user 920 may modify the actuations and attributes associated with the gesture. For example, the user can modify the color 960, the vibrations 970, the sounds 980, or the image 990 associated with the gesture. Alternatively, the user 920 can modify the swipe up gesture to display an image of a happy face, or any visual image, or emoji. If emoji or visual image contains descriptive text, that image will be spoken. For example, a visual image of a car will also include the spoken word "car" when displayed. The user 920, can also modify the language used by the system. If the user is a French speaker and wants to communicate in French, then the user 920 can update the language 950 to French, instead of English which is shown. When the language is updated, then the pre-configured gestures will translate the gestures to words and phrases in French.

Figure 10:
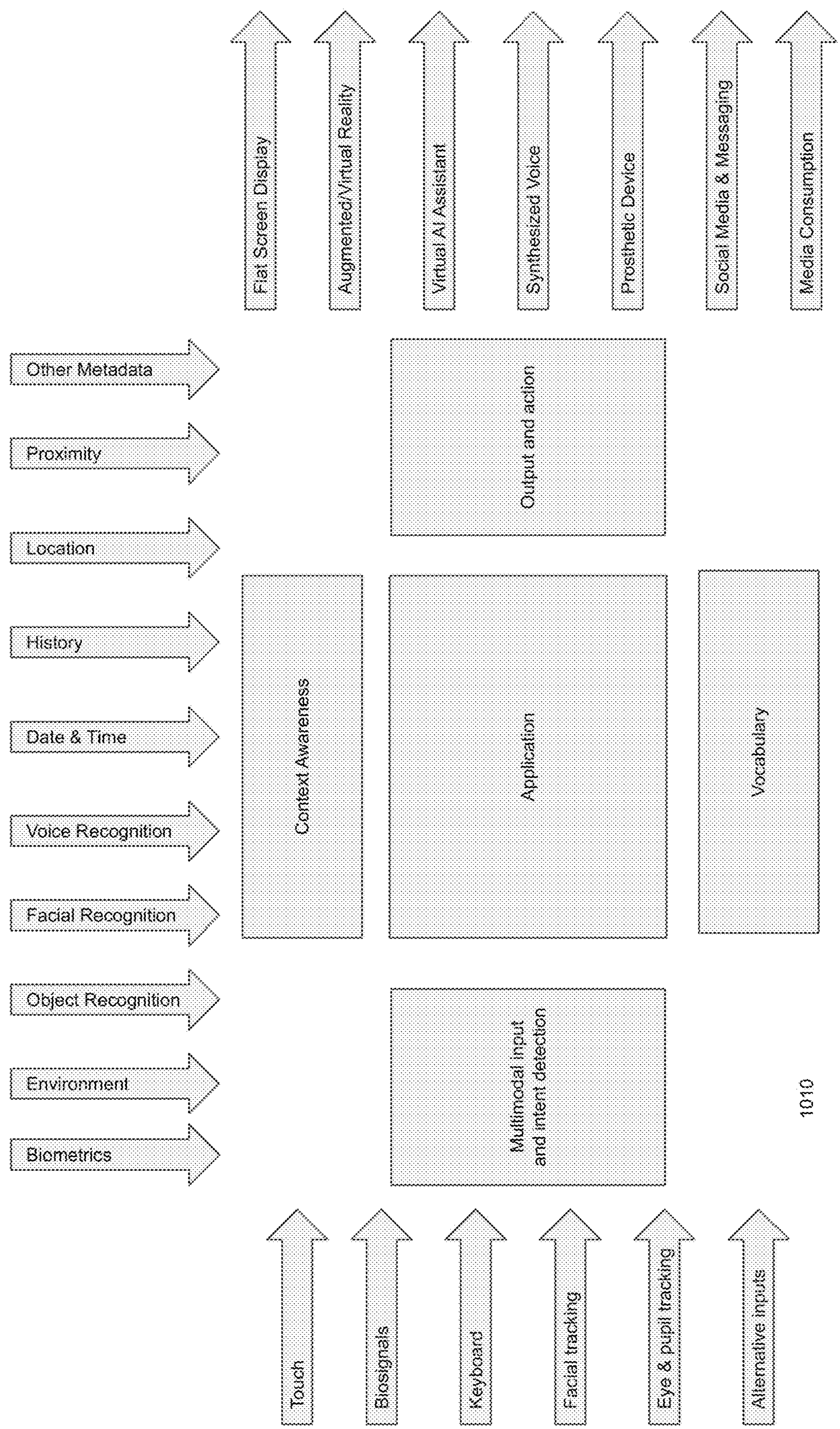
FIG. 10 is a block diagram of a nonverbal multi-input and feedback device.

FIG. 10 is a block diagram 1010 of a nonverbal multi-input and feedback device such as herein. It may be a block diagram of a portion of the device such as a processing portion of the device. FIG. 10 may be a high-level system architecture block diagram of any of FIGS. 1A-C, that helps explain that the major building blocks. Diagram 1010 can be applied to the overall system (e.g. multiple devices used as inputs, into a common universal application interface that enables our application (center) to synchronize data coming from multiple devices—see FIG. 11—and process signals with meta data, plus vocabulary and output logic to a plurality of output methods. FIG. 11 takes this to a finer level of detail.

Figure 20:
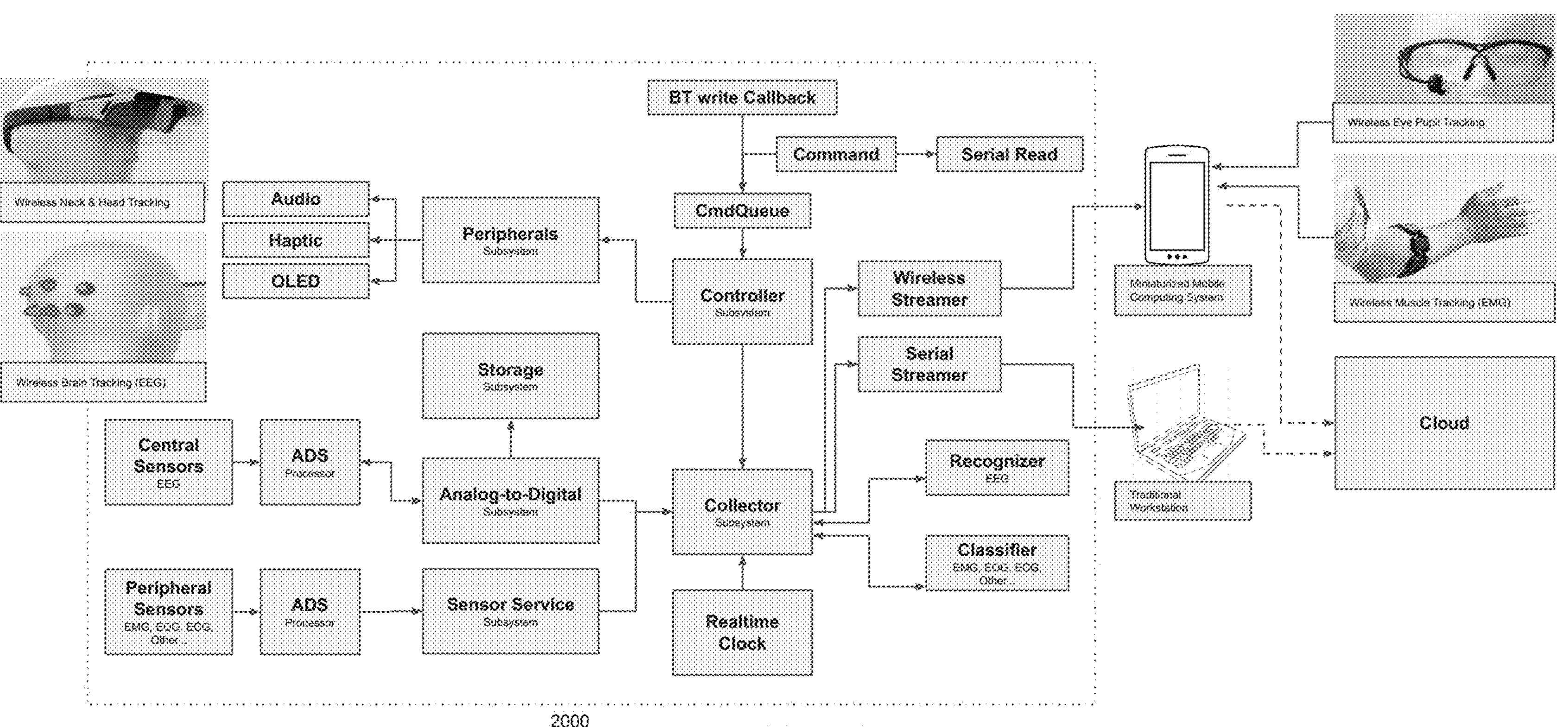
FIG. 20 is a flow diagram showing multimodal, multi-sensory system for communication and control for a nonverbal multi-input and feedback device.

In the center of diagram 1010 is the application or main processing block. To the left is the multimodal input and intent detection block which receives and processes user inputs from sensors (e.g., based on user input received by the sensors) such as touch; biosignals; keyboard; facial tracking; eye and pupil tracking; and alternative inputs. This block feeds the processing from these inputs to the application. Above is a context and awareness block which receives and processes metadata inputs from sensors such as biometrics; environment; object recognition; facial recognition; voice recognition date and time; history; location; proximity and other metadata inputs. This block feeds the processing from these inputs to the application. To the right is an output and action block which sends outputs to displays, computing devices, controllers, speakers and network communication devices such as flat screen display; augmented/virtual reality; virtual AI assistant; synthesized voice; prosthetic device; social media and messaging; media consumption and other outputs. The outputs may include control commands and communication sent to other computing devices. they may include text, graphics, emoji, and/or audio. Below is a vocabulary block that provides a lexicon or vocabulary in the selected language to the application. FIG. 10 may also be applied to a single sensory device unto itself. This may be a "BIG IDEA" in so far as the architecture can scale from a single closed-loop system (such as in FIGS. 13-17, plus 19) as well as combinations of sensory I/O devices (FIGS. 12, 18, 20). It may be a system of systems that scale up, down and play together.

Figure 16:
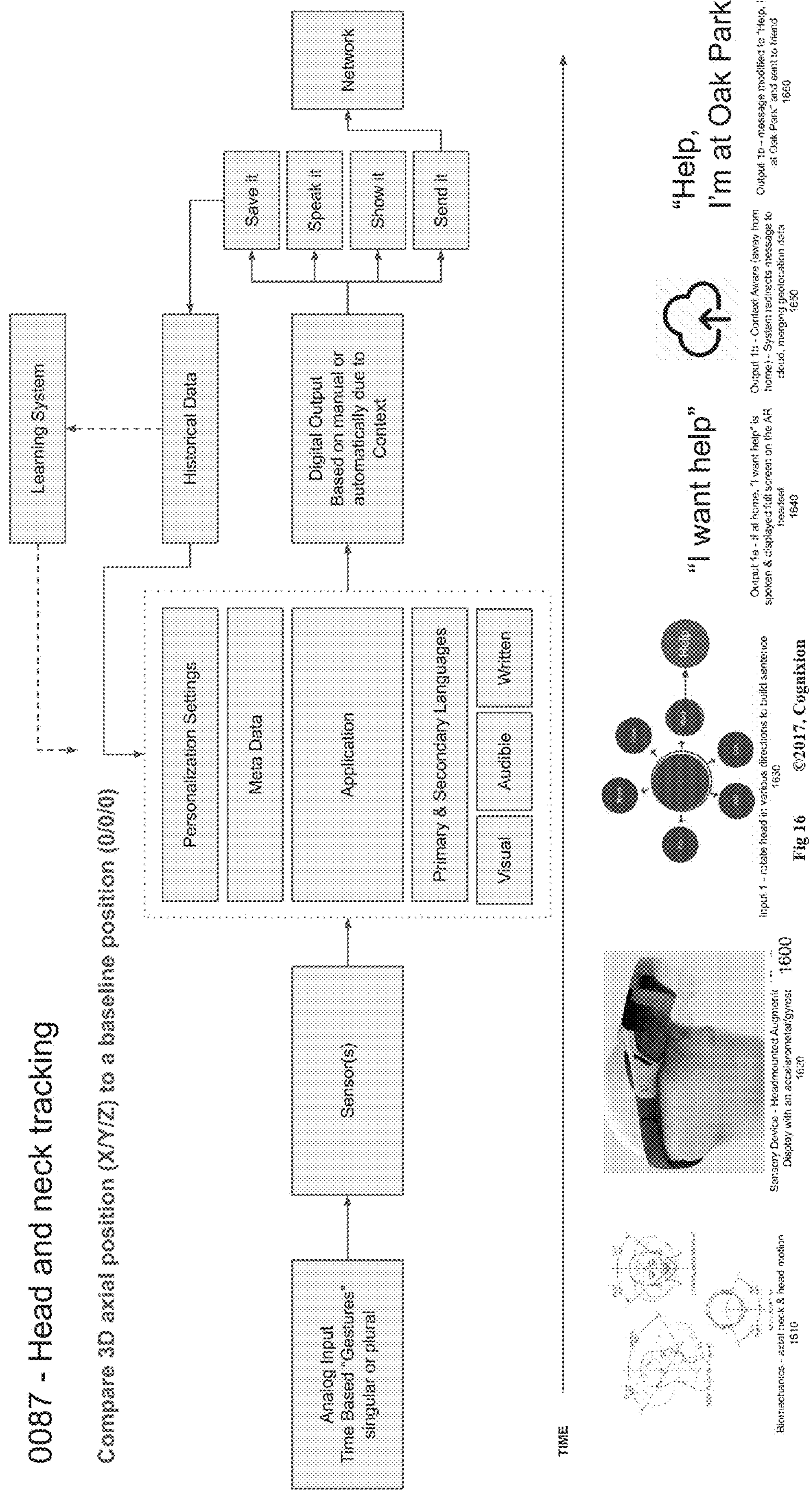
FIG. 16 is a diagram showing flow diagram and related input output example of head and neck tracking for a nonverbal multi-input and feedback device.

The system in diagram 1010 only requires 1 (or more) sensory input, 1 intent detection api, 1 application, 1 (or more) meta data, 1 (or more) vocabulary, 1 (or more) output and action method, and 1 (or more) output/actuation system or device. It may be thought of as a universal "augmented intelligence" engine that takes inputs, enriches them with extra meaning, and directs the output based on instructions for the enriched information. The storyboard in FIG. 16 illustrates the power of this.

In a simple embodiment of diagram 1010, a user sees a symbol or button that means "help", and presses it, and the device says "help". In a more complicated embodiment of diagram 1010, a user sees a symbol or button that means "help", and press it. Here, rather than the device saying "help", it learns that the user is connected to a caregiver with logic to send urgent matters to that person via text or instant message when away from home. The device may geolocation data that indicates the user is away from home; tag the communication with appended contextual information; and its output and action logic tells the system to send a text message to the caregiver with the user's location in a human-understandable grammatically correct phrase "Help, I'm in Oak Park" including the user's Sender ID/Profile and coordinates pinned on a map.

FIG. 11 is a block diagram 1110 of a single framework of a nonverbal multi-input and feedback device such as herein. The block diagram 1110 may be of a single framework for translating diverse sensor inputs into a variety of understandable communication and command outputs for a nonverbal multi-input and feedback device such as herein. FIG. 11 may describe in more detail what kind of processing is happening within and across the blocks of FIG. 10. Specifically, the left intention signals being combined with context awareness metadata to enrich the data in order to determine the logic of the output and action. FIG. 11 may include the description of the Vocabulary and application boxes of FIG. 10, though not shown. It may be a block diagram of a portion of the device such as a processing portion of the device. In the framework, input from the sensors (e.g., due to input received by the sensors) are received by or as an input gesture. In the framework, context awareness is used to interpret or determine the user gesture or intent from the inputs received. In the framework machine learning is used to interpret or determine the user gesture or intent from the inputs received. In the framework, output expression is used to determine the outputs, such as control commands and communication sent to other computing devices that include text, graphics, emoji, and/or audio. In the framework, destination is used to determine where the outputs are sent, such as to what other computing devices the command and/or communications are to be sent (such as by the network). The user's Primary and Secondary language preferences are accessed during the processing of intention data which is stored in the Vocabulary subsystem such as shown in FIG. 10, and may be accessed in the Context Awareness, Machine Learning and Output and Action systems and methods in FIG. 10 and FIG. 11.

FIG. 12 is a table 1210 showing example input/output (I/O) and associated information for a nonverbal multi-input and feedback device such as herein. It may be blocks or processing for a portion of the device such as a processing portion of the device. The I/O examples include tap, swipe, breath, head, face, eye, peripheral neuron, and central neuron tracking. The information includes information for or identifying a timer, sensor, method, state changes, device, gesture example, default meaning, software, processing, whether a match is made (e.g., Yes), metadata and enriched action. The information may include signals used during processing to determine er intended computer control and communication of text, graphics and audio for nonverbal multi-input and feedback devices. FIG. 12 may be a table containing a plurality of sensory devices that can either operate the entire system within itself or interoperate together on a common universal sensory communication and control system like a platform. The table illustrates that each sensory device has very unique sensor technologies ranging from conductive fibers to capacitive touch to camera vision and infrared light to MEMS chips and biophysiological measurement of bioelectric, magnetic or even ultrasound, each with their own unique state change parameters and time-based analog data acquisition and processing, digital conversion methods, and user defined or autonomic gestures to be input and recognized. The table reconciles all of these variable analog to digital input signals into a common universal "meaning making machine" or "meaning inferring machine" that correlates these into a common control interface for manipulating data on a variety of devices ranging from visual displays, audio speakers and haptic vibration actuators. The process is software running on a device that can process, feature match, enrich data, and direct customizable outputs based on the 'meaning+context' of the data. This table attempts to simplify and teach how a singular system architecture, devices and software, could be built to allow for any kind of sensor to be used to product communication and control signals and output commands individually or together via what's called Sensor Fusion. A single platform that can enable variable sensors to interoperate, and deliver a consistent, reliable user experience across devices.

Figure 13:
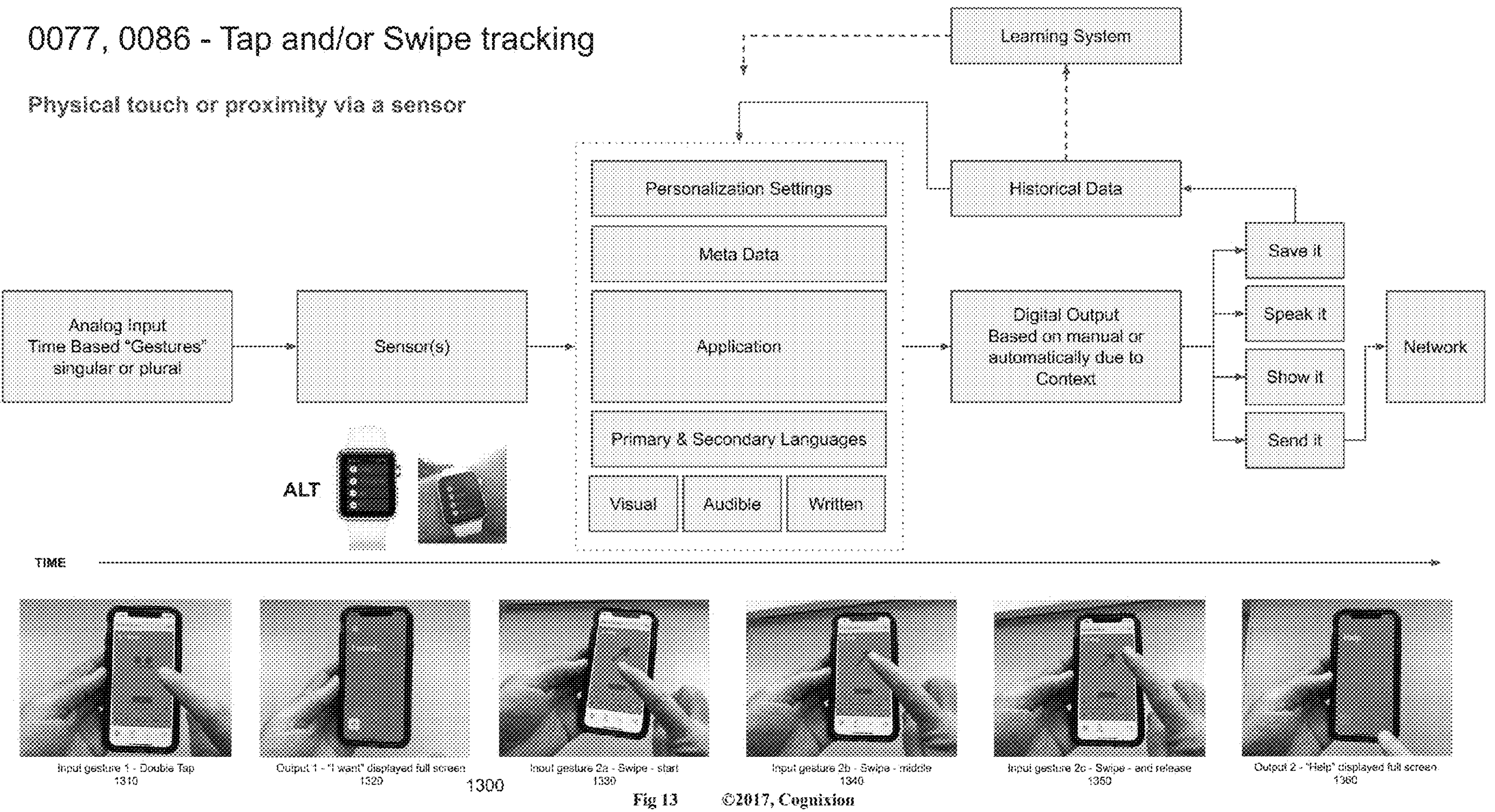
FIG. 13 is a diagram showing flow diagram and related input output example of tap and/or swipe tracking for a nonverbal multi-input and feedback device.

FIG. 13 is a diagram 1300 showing flow diagram and related input output example of tap and/or swipe tracking for a nonverbal multi-input and feedback device such as herein. It may be for tracking of physical touch and/or proximity via one or more sensors of the device. Diagram 1300 may apply to a user holding or wearing such a device with sensor that is a touch sensitive display (see green touchscreen), such as a smartphone, tablet or smartwatch, interacts with the displayed information via proximity and/or pressure sensitive touch inputs. The analog streaming data is acquired by the touch sensors, and digitally processed, either directly on the sensory device or via a remotely connected subsystem. The system may include embedded software on the sensory device that handles the pre-processing of the analog signal. The system may include embedded software that handles the digitization and post-processing of the signals. Post-processing may include but not be limited to various models of compression, feature analysis, classification, metadata tagging, categorization. The system may handle preprocessing, digital conversion, and post-processing using a variety of methods, ranging from statistical to machine learning. As the data is digitally post-processed, system settings and metadata may be referred to determine how certain logic rules in the application are to operate, which may include mapping certain signal features to certain actions. Based on these mappings, the system operates by executing commands and may include saving data locally on the sensory device or another storage device, streaming data to other subsystems or networks.

In the case illustrated in FIG. 13, at steps 1310-1360, the user is looking at a display that may include characters, symbols, pictures, colors, videos, live camera footage or other visual, oral or interactive content. In one example, at 1310 the device receives as input, input gesture 1—Double Tap which is processed and the device outputs at 1320, Output 1—"I want" displayed full screen. In another example, at 1330 the device receives as input, input gesture 2*a*—Swipe—start, then input gesture 2*b*—Swipe—middle, then input gesture 2*c*—Swipe—end release. These inputs are processed and the device outputs at 1360, Output 2—"Help" displayed full screen.

In this example, the user is looking at a mobile tablet or smartphone. The user has been presented a blank 'gesture canvas' with a selection of configurable sequential tap and directional swipe gestures to choose from that are each mapped to a user's preferred communication attributes based on typical functional communication. User can rapidly compose a phrase by executing either a single gesture as a shortcut for an entire phrase, or a sequence of tap, swipe and/or movement gestures to build a phrase. The user progressively chooses the next word until they are satisfied with the phrase they have composed and can determine how to actuate the phrase. Algorithms may be used to predict the next character, word, or phrase, and may rearrange or alter the expression depending on its intended output including but not limited to appending emoji, symbols, colors, sounds or rearranging to correct for spelling or grammar errors. The user may desire for the phrase to be spoken aloud to a person nearby, thus selecting a "play button" or simply allowing the sentence to time out to be executed automatically. If they compose a phrase that is a control command like "turn off the lights", they can select a "send button" or may, based on semantic natural language processing and understanding, automatically send the phrase to a third party virtual assistant system to execute the command, and turn off the lights. The potential use of metadata, in this example, could simply be geolocation data sourced from other systems such as GIS or GPS data or WIFI data, or manually personalized geofencing in the application personalization settings, where the system would know if the user is "at home" or "away from home". In this case, the metadata may play a role in adapting the language being output to reflect the context of the user. For instance, the system could be configured to speak aloud when at home but send to a caregiver via text message and append GPS coordinates when away from home. The system may support collecting and processing historical data from the sensory device, system, subsystems, and output actions to improve the performance and personalization of the system, subsystems, and sensory devices.

In an alternative flow, sensory device 130 has sensors that detect when a user does similar actions as noted above but that combine axial wrist movements plus tap & swipe patterns as shown by the watch type device at "ALT."

Figure 14:
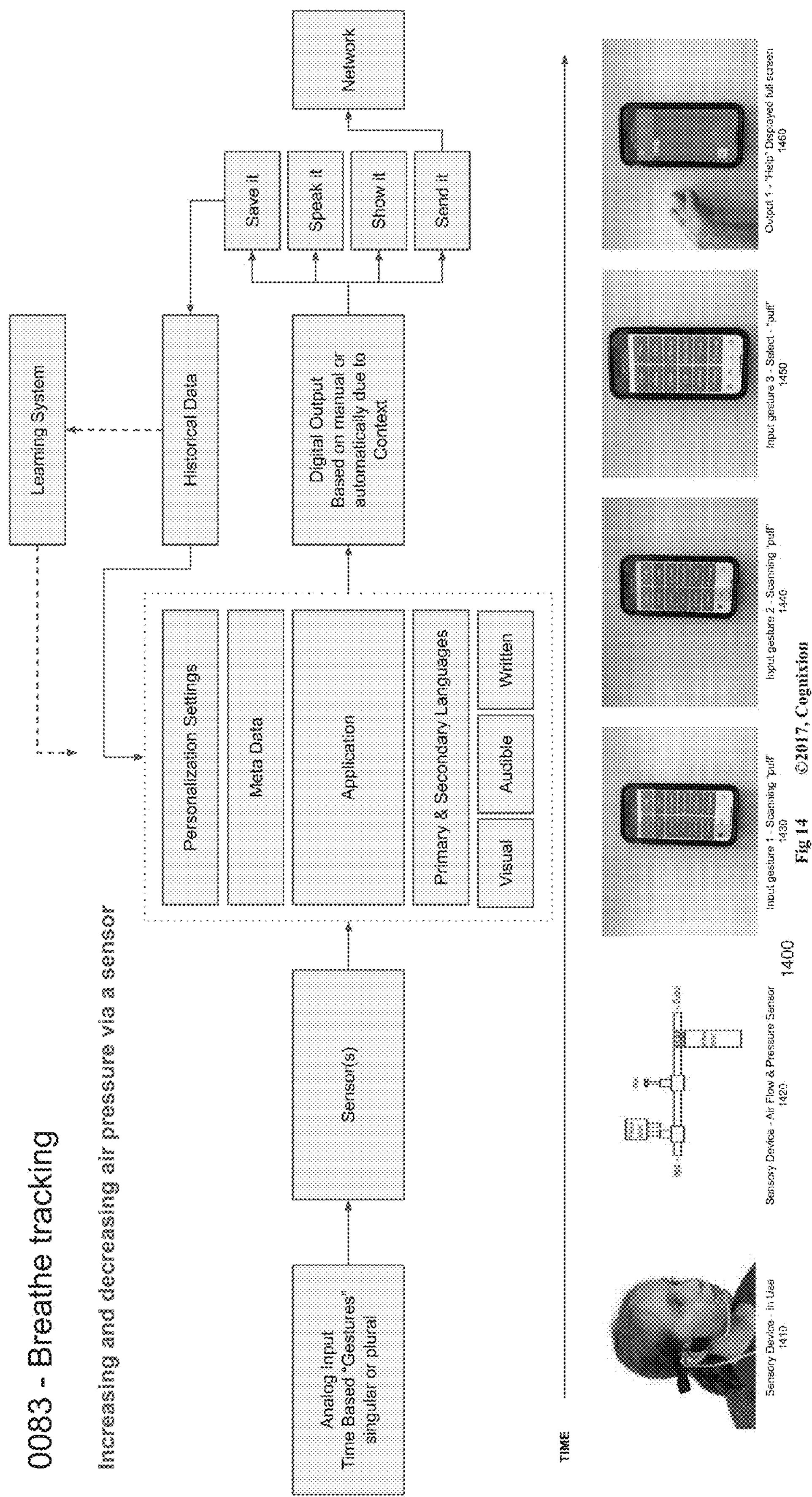
FIG. 14 is a diagram showing flow diagram and related input output example of breathe tracking for a nonverbal multi-input and feedback device.

FIG. 14 is a diagram 1400 showing flow diagram and related input output example of breathe tracking for a nonverbal multi-input and feedback device such as herein. It may be for tracking of increasing and decreasing air pressure via one or more sensors of the device. Diagram 1400 may apply to a user using an air flow and air pressure sensory device that includes a tube that the user sips or puffs into to produce positive and negative air pressure and air flow that is detected by a sensor and a valve. The device can be mechanical or digital, and measures the amount of air flow and pressure in realtime. The user produces breath patterns that the sensory device interprets, matches and sends a digital signal to a universal sensory communication system to execute a command. The analog streaming data is acquired by the air flow and air pressure sensory device, and digitally processed, either directly on the sensory device or via a remotely connected subsystem. The system may include embedded software on the sensory device that handles the pre-processing of the analog signal. The system may include embedded software that handles the digitization and post-processing of the signals. Post-processing may include but not be limited to various models of compression, feature analysis, classification, metadata tagging, categorization. The system may handle preprocessing, digital conversion, and post-processing using a variety of methods, ranging from statistical to machine learning. As the data is digitally post-processed, system settings and metadata may be referred to determine how certain logic rules in the application are to operate, which may include mapping certain signal features to certain actions. Based on these mappings, the system operates by executing commands and may include saving data locally on the sensory device or another storage device, streaming data to other subsystems or networks.

In the case illustrated in FIG. 14, at steps 1410-1460, the user is looking at a display (see green touchscreen) that may include characters, symbols, pictures, colors, videos, live camera footage or other visual, oral or interactive content. In one example, at 1410-1450 the device receives as input, the following sequence: Sensory Device—In Use; Sensory Device—Air Flow & Pressure Sensor; Input gesture 1—Scanning "puff"; Input gesture 2—Scanning "puff"; Input gesture 3—Select—"puff". These inputs are processed and the device outputs at 1460, Output 1—"Help" Displayed full screen.

In this example, the user is looking at a smartphone display. The user has been presented a set of words to choose from based on typical functional communication with suggested fringe words and access to predictive keyboard and can rapidly compose a phrase by selecting the next desired word presented in the sentence building interface, or adding a new word manually. The sensory device is sending a basic switch command to have the application scan horizontally, puff to stop scanning, and start scanning vertically, puff to stop scanning, creating an X/Y coordinate intersection over a word. The user then puffs again to select the word. The user progressively chooses the next word until they're satisfied with the phrase they've composed and can determine how to actuate the phrase. Algorithms may be used to predict the next character, word, or phrase, and may rearrange or alter the expression depending on it's intended output including but not limited to appending emoji, symbols, colors, sounds or rearranging to correct for spelling or grammar errors. The user may desire for the phrase to be spoken aloud to a person nearby, thus selecting a "play button" or simply allowing the sentence to time out to be executed automatically. If they compose a phrase that is a control command like "turn off the lights", they can select a "send button" or may, based on semantic natural language processing and understanding, automatically send the phrase to a third party virtual assistant system to execute the command, and turn off the lights. The potential use of metadata, in this example, could simply be geolocation data sourced from other systems such as GIS or GPS data or WIFI data, or manually personalized geofencing in the application personalization settings, where the system would know if the user is "at home" or "away from home". In this case, the metadata may play a role in adapting the language being output to reflect the context of the user. For instance, the system could be configured to speak aloud when at home but send to a caregiver via text message and append GPS coordinates when away from home. The system may support collecting and processing historical data from the sensory device, system, subsystems, and output actions to improve the performance and personalization of the system, subsystems, and sensory devices.

Figure 15:
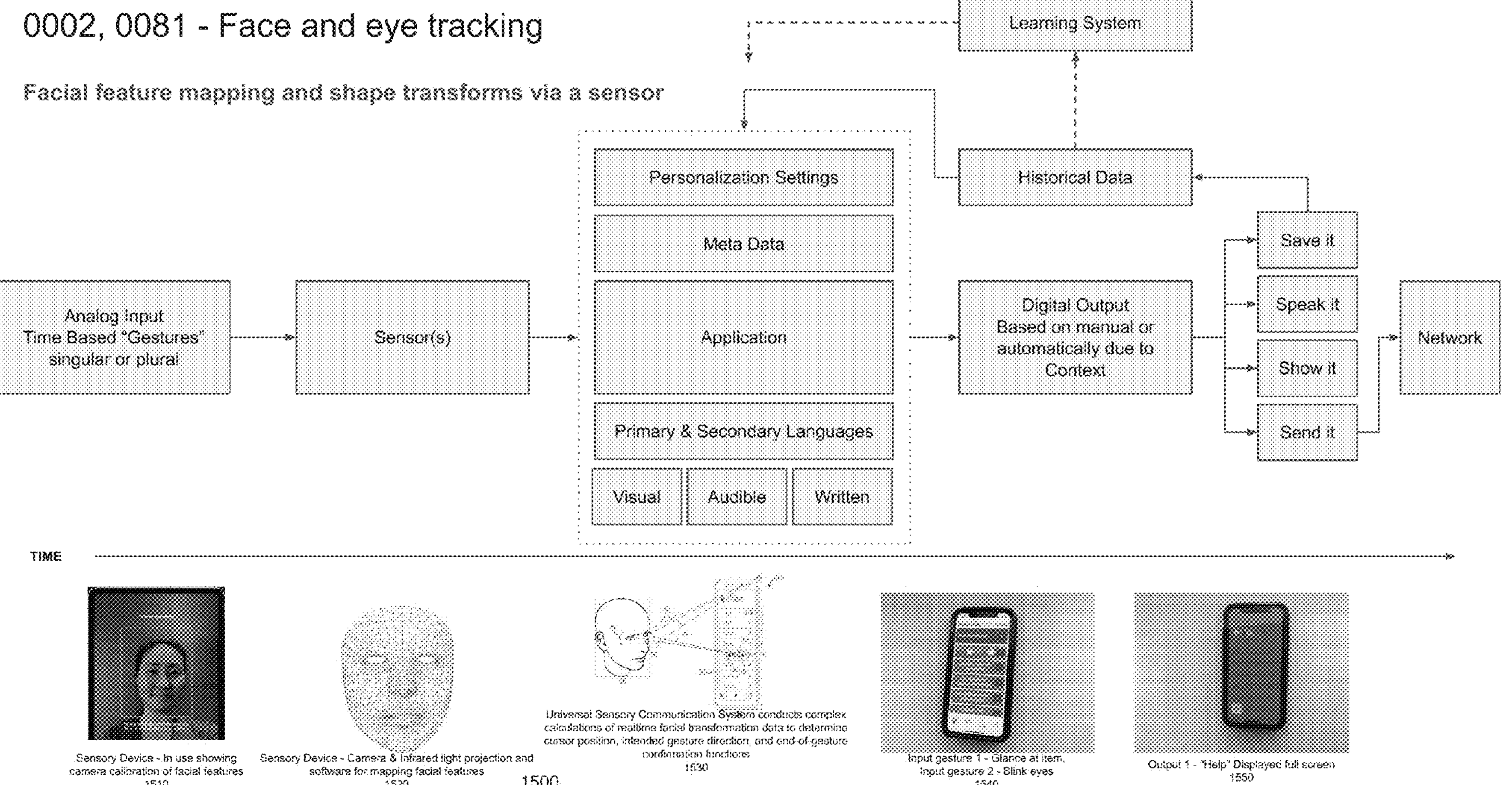
FIG. 15 is a diagram showing flow diagram and related input output example of face and eye tracking for a nonverbal multi-input and feedback device.

FIG. 15 is a diagram 1500 showing flow diagram and related input output example of face and eye tracking for a nonverbal multi-input and feedback device such as herein. It may be for tracking of facial feature mapping and shape transforms via one or more sensors of the device. Diagram 1500 may apply to a user looking at a visual display—either a smartphone, mobile tablet, augmented reality, virtual reality, mixed reality, computer monitor or television. The sensory device may include a camera and an infrared light projector. This hardware is preferred to be integrated into the display device, but may be connected as a separate accessory. The infrared light is projected onto the user's body, face or more narrowly limited to specific facial areas like the eyes, nose, brows, mouth or cheeks. The infrared light may have a plurality of beams projected onto the face in order to produce a topographical mesh of which points may be mapped and analyzed by the camera and system. The speed of which this analysis occurs may be continuous, at high speed or low speed, or intermittent. The analog streaming data is acquired by the camera, and digitally processed, either directly on the sensory device or via a remotely connected subsystem. The system may include embedded software on the sensory device that handles the pre-processing of the analog signal. The system may include embedded software that handles the digitization and post-processing of the signals. Post-processing may include but not be limited to various models of compression, feature analysis, classification, metadata tagging, categorization. The system may handle preprocessing, digital conversion, and post-processing using a variety of methods, ranging from statistical to machine learning. As the data is digitally post-processed, system settings and metadata may be referred to determine how certain logic rules in the application are to operate, which may include mapping certain signal features to certain actions. Based on these mappings, the system operates by executing commands and may include saving data locally on the sensory device or another storage device, streaming data to other subsystems or networks.

In the case illustrated in FIG. 15, at steps 1510-1550, the user is looking at a display (see green touchscreen) that may include characters, symbols, pictures, colors, videos, live camera footage or other visual, oral or interactive content. In one example, at 1510-1540 the device receives as input, the following sequence: Sensory Device—In use showing camera calibration of facial features; Sensory Device—Camera & Infrared light projection and software for mapping facial features; Universal Sensory Communication System conducts complex calculations of realtime facial transformation data to determine cursor position, intended gesture direction, and end-of-gesture confirmation functions; Input gesture 1—Glance at item, Input gesture 2—Blink eyes. These inputs are processed and the device outputs at 1550, Output 1—"Help" Displayed full screen.

In this example, the user is looking at a mobile tablet that includes infrared light projection and a camera to map the user's face in realtime, calibrating movements and transformations of facial features and environmental conditions like ambient light changes. The user has been presented a set of words to choose from based on typical functional communication with suggested fringe words and access to predictive keyboard and saved phrases and can rapidly compose a phrase by selecting the next desired word presented in the sentence builder, or adding a new word manually by selecting and using a predictive keyboard. In order to select an item, the user can move the direction of their face towards an item grossly moving a cursor towards the intended object, then may use eye movement to fine tune their cursor control. In this example, the user may blink to select an item or hold their gaze on an item for a set duration of time to select it. The user progressively chooses the next word until they're satisfied with the phrase they've composed and can determine how to actuate the phrase. Algorithms may be used to predict the next character, word, or phrase, and may rearrange or alter the expression depending on it's intended output including but not limited to appending emoji, symbols, colors, sounds or rearranging to correct for spelling or grammar errors. The user may desire for the phrase to be spoken aloud to a person nearby, thus selecting a "play button" or simply allowing the sentence to time out to be executed automatically. If they compose a phrase that is a control command like "turn off the lights", they can select a "send button" or may, based on semantic natural language processing and understanding, automatically send the phrase to a third party virtual assistant system to execute the command, and turn off the lights. The potential use of metadata, in this example, could simply be geolocation data sourced from other systems such as GIS or GPS data or WIFI data, or manually personalized geofencing in the application personalization settings, where the system would know if the user is "at home" or "away from home". In this case, the metadata may play a role in adapting the language being output to reflect the context of the user. For instance, the system could be configured to speak aloud when at home but send to a caregiver via text message and append GPS coordinates when away from home. The system may support collecting and processing historical data from the sensory device, system, subsystems, and output actions to improve the performance and personalization of the system, subsystems, and sensory devices.

FIG. 16 is a diagram 1600 showing flow diagram and related input output example of head and neck tracking for a nonverbal multi-input and feedback device such as herein. It may be for comparing 3D axial position (X/Y/Z) to a baseline position (0/0/0) via one or more sensors of the device. Diagram 1600 may apply to a user wearing an augmented reality headset that includes a display, speakers and vibration haptic motors and an accelerometer/gyroscope and magnetometer. The user may calibrate the headset based on the most comfortable and stable neck and head position which establishes the X/Y/Z position of 0/0/0. Based on this central ideal position, the user interface is adjusted to conform to the user's range of motion limitations, with an emphasis of reducing the amount of effort and distance required to move a virtual pointer in augmented reality from the 0/0/0 position to outer limits of their field of view and range of motion. The System may be personalized with various ergonomic settings to offset and enhance the user's ease of use and comfort using the system. The analog streaming data is acquired by the motion sensors in real-time, and digitally processed, either directly on the sensory device or via a remotely connected subsystem. The system may include embedded software on the sensory device that handles the pre-processing of the analog signal. The system may include embedded software that handles the digitization and post-processing of the signals. Post-processing may include but not be limited to various models of compression, feature analysis, classification, metadata tagging, categorization. The system may handle preprocessing, digital conversion, and post-processing using a variety of methods, ranging from statistical to machine learning. As the data is digitally post-processed, system settings and metadata may be referred to determine how certain logic rules in the application are to operate, which may include mapping certain signal features to certain actions. Based on these mappings, the system operates by executing commands and may include saving data locally on the sensory device or another storage device, streaming data to other subsystems or networks.

In the case illustrated in FIG. 16, at steps 1610-1660, the user is looking at a display that may include characters, symbols, pictures, colors, videos, live camera footage or other visual, oral or interactive content. In one example, at 1610-1640 the device receives as input, the following sequence: Biomechanics—axial neck & head motion; Sensory Device—Headmounted Augmented Reality Display with an accelerometer/gyroscope; Input 1—rotate head in various directions to build sentence; Output 1*a*—if at home, "I want help" is spoken & displayed full screen on the AR headset. These inputs are processed and at 1650-1660 the device outputs the following sequence: Output 1*b*—Context Aware (away from home)—System redirects message to cloud, merging geolocation data; and Output 1*b*—message modified to "Help, I'm at Oak Park" and sent to friend.

In this example, the user is looking at a set of "radial menus" or collection of boxes or circles with data in each one that may be a symbol, character, letter, word or entire phrase. The user has been presented a set of words that surround a central phrase starter word in the middle like a hub and spoke to choose from based on typical functional communication with suggested fringe words and access to predictive keyboard, structured and unstructured language. The user can rapidly compose a phrase by selecting the next desired word presented in the radial menus, or adding a new word manually via another input method. The user traverses the interface using head movement gestures, similar to 3-dimensional swipe movements, to compose communication. The user progressively chooses the next word until they're satisfied with the phrase they've composed and can determine how to actuate the phrase. Algorithms may be used to predict the next character, word, or phrase, and may rearrange or alter the expression depending on its intended output including but not limited to appending emoji, symbols, colors, sounds or rearranging to correct for spelling or grammar errors. The user may desire for the phrase to be spoken aloud to a person nearby, thus selecting a "play button" or simply allowing the sentence to time out to be executed automatically. If they compose a phrase that is a control command like "turn off the lights", they can select a "send button" or may, based on semantic natural language processing and understanding, automatically send the phrase to a third party virtual assistant system to execute the command, and turn off the lights. The potential use of metadata, in this example, could simply be geolocation data sourced from other systems such as GIS or GPS data or WIFI data, or manually personalized geofencing in the application personalization settings, where the system would know if the user is "at home" or "away from home". In this case, the metadata may play a role in adapting the language being output to reflect the context of the user. For instance, the system could be configured to speak aloud when at home but send to a caregiver via text message and append GPS coordinates when away from home. The system may support collecting and processing historical data from the sensory device, system, subsystems, and output actions to improve the performance and personalization of the system, subsystems, and sensory devices.

Figure 17:
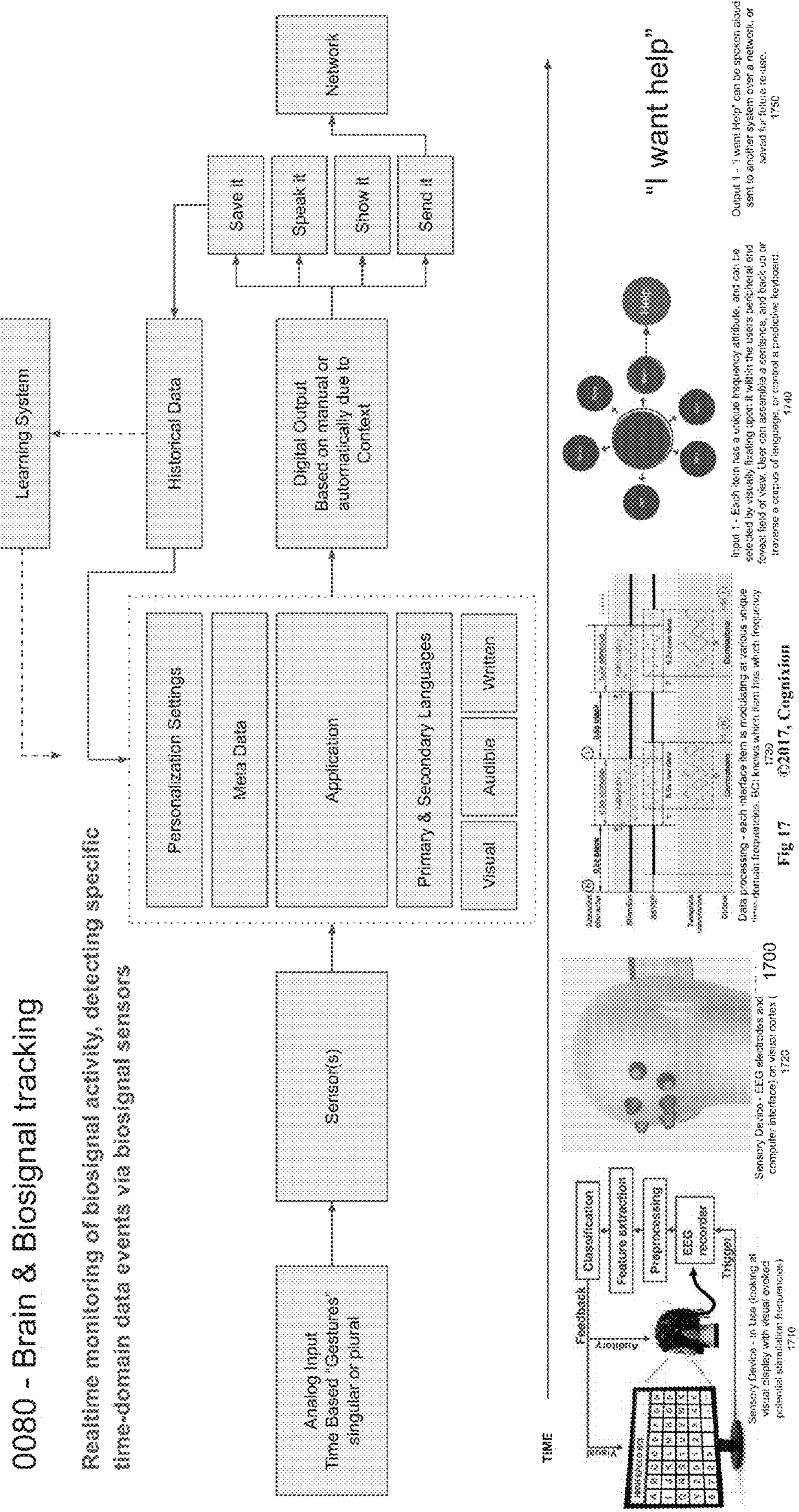
FIG. 17 is a diagram showing flow diagram and related input output example of brain and biosignal tracking for a nonverbal multi-input and feedback device.
Figure 18:
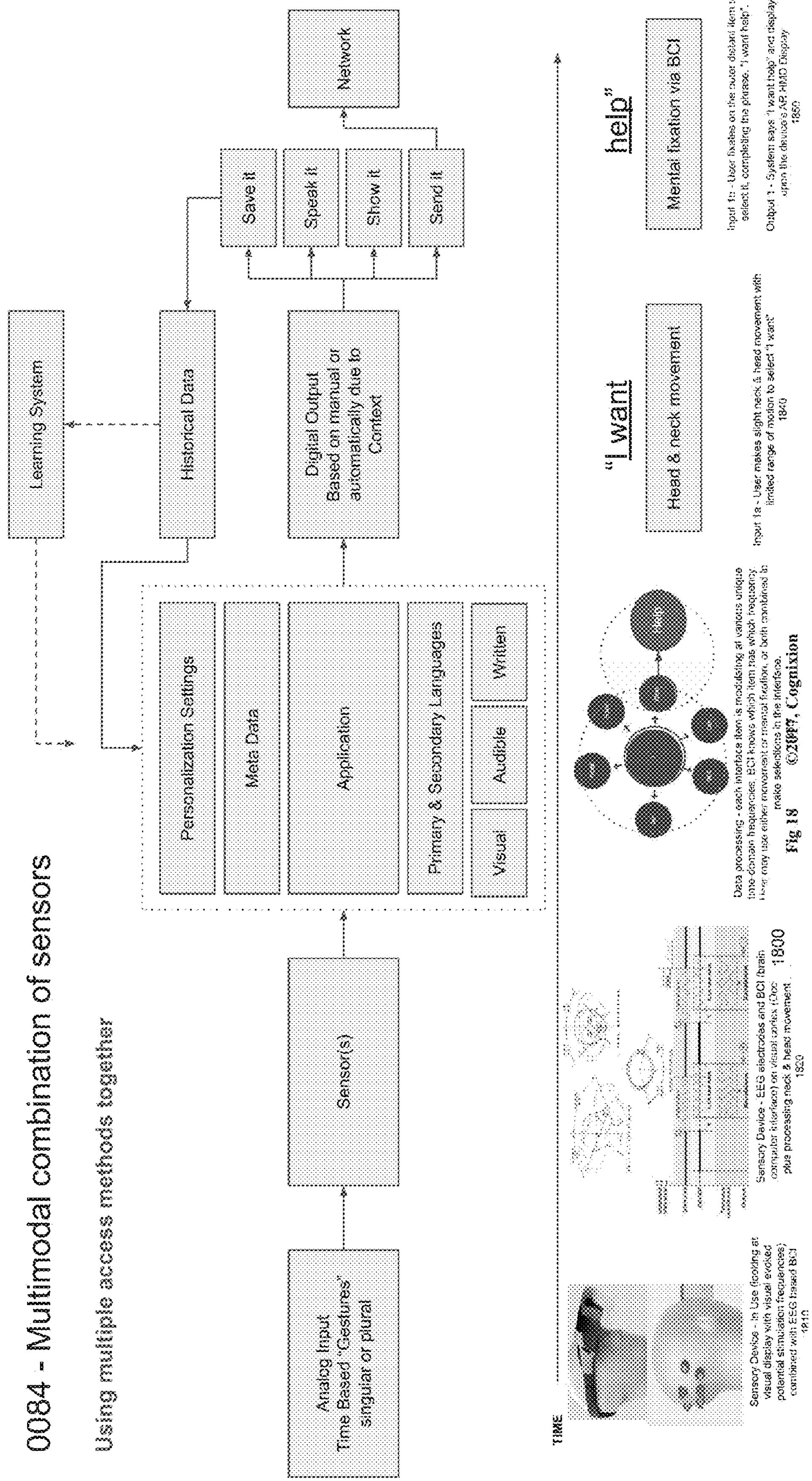
FIG. 18 is a diagram showing flow diagram and related input output example of multimodal combination of sensors for a nonverbal multi-input and feedback device.

FIG. 17 is a diagram 1700 showing flow diagram and related input output example of brain and biosignal tracking for a nonverbal multi-input and feedback device such as herein. It may be for realtime monitoring of biosignal activity, detecting specific time-domain data events via one or more biosignal sensors of the device. Diagram 1700 may apply to a user wearing an EEG-based brain-computer interface headset containing electrodes that are contacting the scalp. The electrodes are connected to an amplifier and analog-to-digital processing pipeline. The sensory device (BCI) acquires streaming electrical current data measured in microvolts (mV). The more electrodes connected to the scalp and to the BCI, the more streaming analog data can be acquired from the brainwave activity. The analog streaming data is acquired by the electrodes, pre-processed through amplification, and digitally processed, either directly on the sensory device or via a remotely connected subsystem. The system may include embedded software on the sensory device that handles the pre-processing of the analog signal. The system may include embedded software that handles the digitization and post-processing of the signals. Post-processing may include but not be limited to various models of compression, feature analysis, classification, metadata tagging, categorization. The system may handle preprocessing, digital conversion, and post-processing using a variety of methods, ranging from statistical to machine learning. As the data is digitally post-processed, system settings and metadata may be referred to determine how certain logic rules in the application are to operate, which may include mapping certain signal features to certain actions. Based on these mappings, the system operates by executing commands and may include saving data locally on the sensory device or another storage device, streaming data to other subsystems or networks.

In the case illustrated in FIG. 17, at steps 1710-1750, the user is looking at a display that may include characters, symbols, pictures, colors, videos, live camera footage or other visual, oral or interactive content. In one example, at 1710-1740 the device receives as input, the following sequence: Sensory Device—In Use (looking at visual display with visual evoked potential stimulation frequencies);

Sensory Device—EEG electrodes and BCI (brain computer interface) on visual cortex (Occipital); Data processing—each interface item is modulating at various unique time-domain frequencies (see different color bars of step 1730), BCI knows which item has which frequency; Input 1—Each item has a unique frequency attribute, and can be selected by visually fixating upon it within the user's peripheral and foveal field of view. User can assemble a sentence, and back up or traverse a corpus of language, or control a predictive keyboard. These inputs are processed and the device outputs at 1750, Output 1—"I want Help" can be spoken aloud, sent to another system over a network, or saved for future re-use.

In this example, the user is looking at a group of concentric circles, arranged in a radial layout, with characters on each circle. The user has been presented a set of words to choose from based on typical functional communication with suggested fringe words and access to predictive keyboard and can rapidly compose a phrase by selecting the next desired word presented in the outer ring of circles, or adding a new word manually. The user progressively chooses the next word until they're satisfied with the phrase they've composed and can determine how to actuate the phrase. Algorithms may be used to predict the next character, word, or phrase, and may rearrange or alter the expression depending on it's intended output including but not limited to appending emoji, symbols, colors, sounds or rearranging to correct for spelling or grammar errors. The user may desire for the phrase to be spoken aloud to a person nearby, thus selecting a "play button" or simply allowing the sentence to time out to be executed automatically. If they compose a phrase that is a control command like "turn off the lights", they can select a "send button" or may, based on semantic natural language processing and understanding, automatically send the phrase to a third party virtual assistant system to execute the command, and turn off the lights. The potential use of metadata, in this example, could simply be geolocation data sourced from other systems such as GIS or GPS data or WIFI data, or manually personalized geofencing in the application personalization settings, where the system would know if the user is "at home" or "away from home". In this case, the metadata may play a role in adapting the language being output to reflect the context of the user. For instance, the system could be configured to speak aloud when at home but send to a caregiver via text message and append GPS coordinates when away from home. The system may support collecting and processing historical data from the sensory device, system, subsystems, and output actions to improve the performance and personalization of the system, subsystems, and sensory devices.

FIG. 18 is a diagram 1800 showing flow diagram and related input output example of multimodal combination of sensors (e.g., tracking and/or processing) for a nonverbal multi-input and feedback device such as herein. It may be for using multiple access methods together for input data received via one or more sensors of the device. Diagram 1800 may apply to a user wearing an augmented reality headset combined with a brain computer interface on their head. The headset contains numerous sensors as a combined sensory device including motion and orientation sensors and temporal bioelectric data generated from the brain detected via EEG electrodes contacting the scalp of the user, specifically in the regions where visual, auditory and sensory/touch is processed in the brain. The AR headset may produce visual, auditory and/or haptic stimulation that is detectible via the brain computer interface, and by processing brainwave data with motion data, the system may provide new kinds of multi-modal capabilities for a user to control the system. The analog streaming data is acquired by the Accelerometer, Gyroscope, Magnetometer and EEG analog-to-digital processor, and digitally processed, either directly on the sensory device or via a remotely connected subsystem. The system may include embedded software on the sensory device that handles the pre-processing of the analog signal. The system may include embedded software that handles the digitization and post-processing of the signals. Post-processing may include but not be limited to various models of compression, feature analysis, classification, metadata tagging, categorization. The system may handle preprocessing, digital conversion, and post-processing using a variety of methods, ranging from statistical to machine learning. As the data is digitally post-processed, system settings and metadata may be referred to determine how certain logic rules in the application are to operate, which may include mapping certain signal features to certain actions. Based on these mappings, the system operates by executing commands and may include saving data locally on the sensory device or another storage device, streaming data to other subsystems or networks.

In the case illustrated in FIG. 18, at steps 1810-1850, the user is looking at a display that may include characters, symbols, pictures, colors, videos, live camera footage or other visual, oral or interactive content. In one example, at 1810-1840 the device receives as input, the following sequence: Sensory Device—In Use (looking at visual display with visual evoked potential stimulation frequencies) combined with EEG based BCI; Sensory Device—EEG electrodes and BCI (brain computer interface) on visual cortex (Occipital), plus processing neck & head movement data; Sensory Device—EEG electrodes and BCI (brain computer interface) on visual cortex (Occipital), plus processing neck & head movement data; Data processing—each interface item is modulating at various unique time-domain frequencies, BCI knows which item has which frequency (see different color bars of step 1820). User may use either movement or mental fixation, or both combined to make selections in the interface; Input 1*a*—User makes slight neck & head movement with limited range of motion to select "I want"; Input 1*b*—User fixates on the outer distant item to select it, completing the phrase, "I want help". These inputs are processed and the device outputs at 1850, Output 1—System says "I want help" and displays upon the device's AR HMD Display.

In this example, the user is looking at a visual menu system in AR with certain hard to reach elements flickering at different frequencies. The user has been presented a set of items to choose from based on typical functional communication with suggested fringe words and access to predictive keyboard and can rapidly compose a phrase by selecting the next desired word presented in the AR head mounted display, or adding a new word manually. Enabling the user affordances of extra-sensory reach of visible objects out of reach within the comfortable range of motion of neck movement. The user progressively chooses the next word until they're satisfied with the phrase they've composed and can determine how to actuate the phrase. Algorithms may be used to predict the next character, word, or phrase, and may rearrange or alter the expression depending on its intended output including but not limited to appending emoji, symbols, colors, sounds or rearranging to correct for spelling or grammar errors. The user may desire for the phrase to be spoken aloud to a person nearby, thus selecting a "play button" or simply allowing the sentence to time out to be executed automatically. If they compose a phrase that is a control command like "turn off the lights", they can select a "send button" or may, based on semantic natural language processing and understanding, automatically send the phrase to a third party virtual assistant system to execute the command, and turn off the lights. The potential use of metadata, in this example, could simply be geolocation data sourced from other systems such as GIS or GPS data or WIFI data, or manually personalized geofencing in the application personalization settings, where the system would know if the user is "at home" or "away from home". In this case, the metadata may play a role in adapting the language being output to reflect the context of the user. For instance, the system could be configured to speak aloud when at home but send to a caregiver via text message and append GPS coordinates when away from home. The system may support collecting and processing historical data from the sensory device, system, subsystems, and output actions to improve the performance and personalization of the system, subsystems, and sensory devices.

Figure 19:
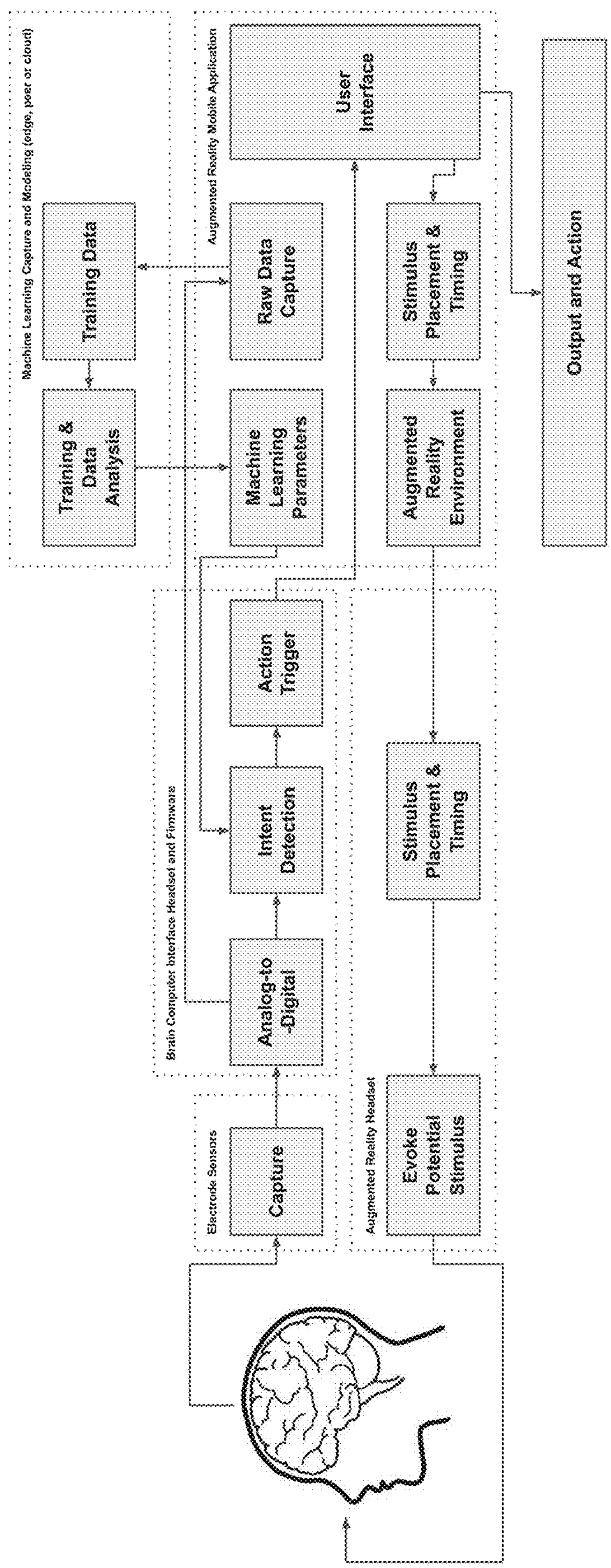
FIG. 19 is a flow diagram showing a closed loop biosignal data flow for a nonverbal multi-input and feedback device.

FIG. 19 is a flow diagram 1900 showing a closed loop biosignal data flow for a nonverbal multi-input and feedback device such as herein. It may be performed by inputs or a computer of the device. The flow 1900 includes computer stimulates visual, auditory and somatosensory cortex with evoked potentials; signal processing of realtime streaming brain response; human controls computer based on mental fixation of stimulation frequencies; and system can determine different output or actions on behalf of the user for input data received via one or more sensors of the device. Diagram 1900 may apply to a user wearing any of the nonverbal multi-input and feedback devices and/or sensors herein. As a result of this being closed-loop biofeedback and sensory communication and control system that stimulates the brains senses of sight, sound, and touch and reads specific stimulation time-based frequencies, and tags them with metadata in real-time as the analog data is digitized, the user can rapidly learn how to navigate and interact with the system using their brain directly. This method of reinforcement learning is known in the rapid development process of the brain's pattern recognition abilities and the creation of neural plasticity to develop new neural connections based on stimulation and entrainment. This further enables the system to become a dynamic neural prosthetic extension of their physical and cognitive abilities. The merging of context-awareness metadata, vocabulary, and output and action logic into the central application in addition to a universal interface for signal acquisition and data processing is what makes this system extremely special. Essentially, this system helps reduce the time latency between detecting cognitive intention and achieving the associated desired outcome, whether that be pushing a button, saying a word or controlling robots, prosthetics, smart home devices or other digital systems.

FIG. 20 is a flow diagram 2000 showing multimodal, multi-sensory system for communication and control for a nonverbal multi-input and feedback device such as herein. It may be performed by inputs or a computer of the device. The flow 2000 includes synchronizing signals from multiple biosensors including brain, body (see skin colored arm), eye and movement; processing multiple models concurrently for multi-sensory input; and directing and processing biofeedback through peripheral subsystems. Diagram 2000 may apply to a user wearing any of the nonverbal multi-input and feedback devices and/or sensors herein.

Figure 21:
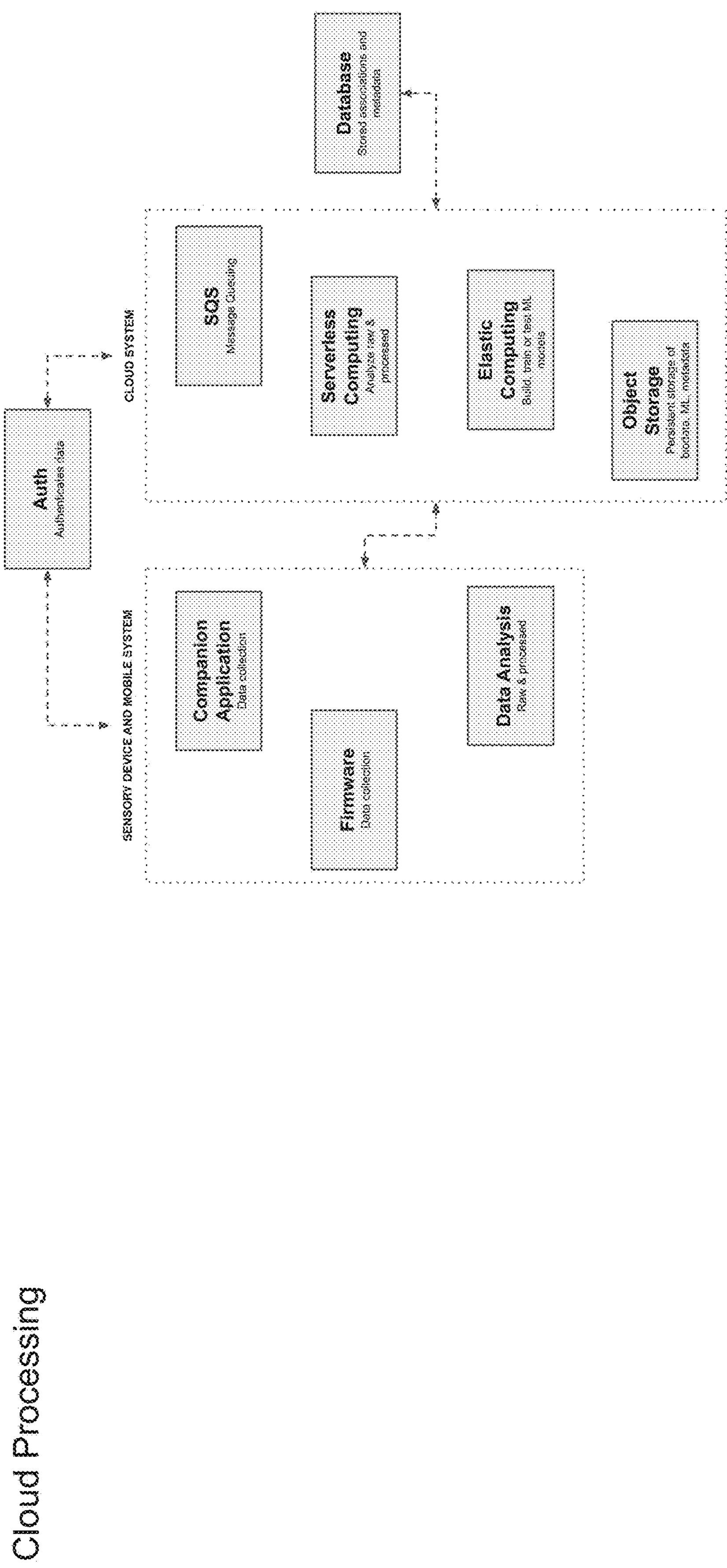
FIG. 21 is a block diagram showing an example of cloud processing for a nonverbal multi-input and feedback device.

FIG. 21 is a block diagram 2100 showing an example of cloud processing for a nonverbal multi-input and feedback device such as herein. It has the cloud system, the nonverbal multi-input device and an authorization system. Diagram 2100 includes: machine Learning processing signal data on device; metadata enrichment; push raw and processed data to cloud; cloud application building new models for devices; system updates devices remotely and wirelessly; secure and privacy compliant. This configuration is quite powerful but unassumingly simple in this block diagram.

Figure 22:
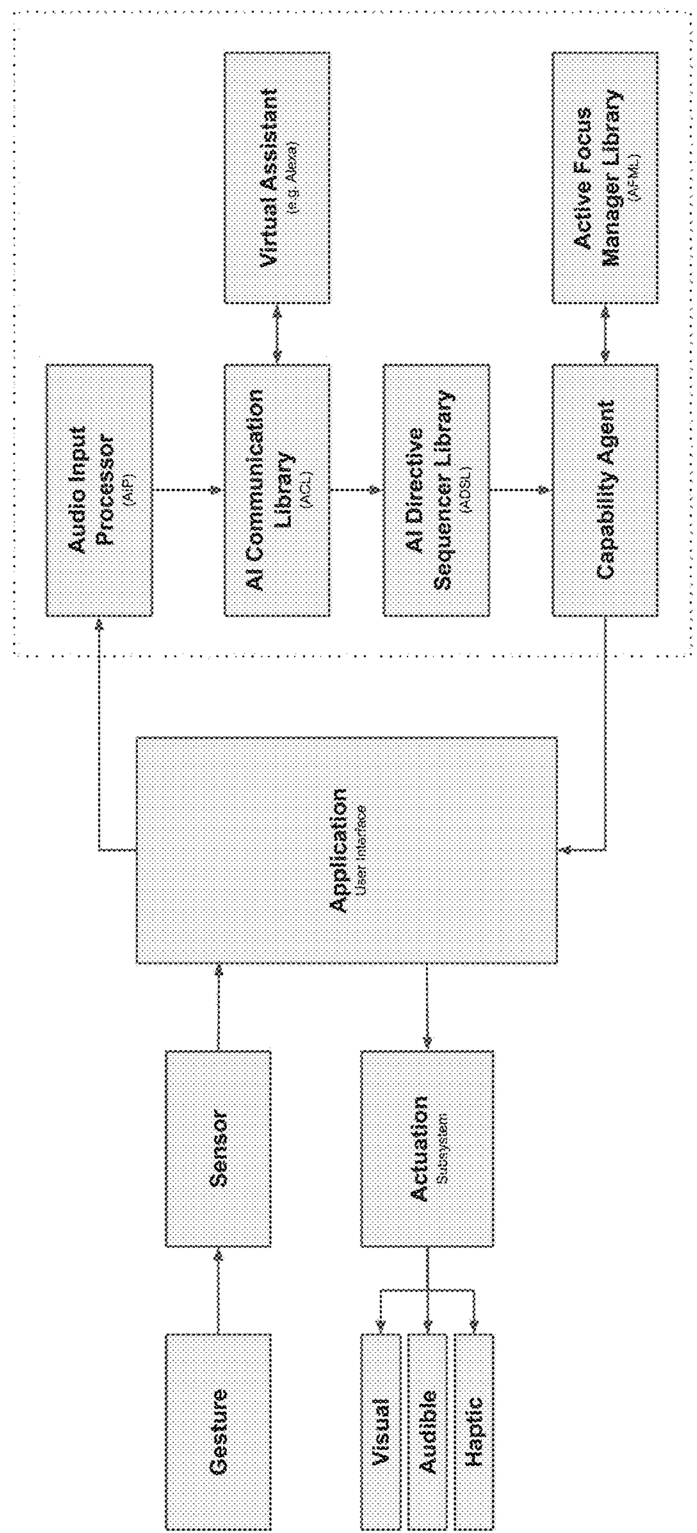
FIG. 22 is a block diagram showing an example of a system architecture for integrated virtual AI assistant and web services for a nonverbal multi-input and feedback device.

FIG. 22 is a block diagram 2200 showing an example of a system architecture for integrated virtual AI assistant and web services for a nonverbal multi-input and feedback device such as herein. Diagram 2200 includes: system manages intention signal acquisition, processing, language composition, and output; in the event where a user wants to send their intention to a virtual assistant (like Alexa, Siri). The blocks outside of the dashed border run on the sensory device, and currently, the blocks inside the dashed line are running in the cloud (e.g., represent a custom configuration for how to using the Alexa service in a cloud architecture.) It could also be possible that all of what's described here as in the cloud could run locally in the sensory device.

Figure 23:
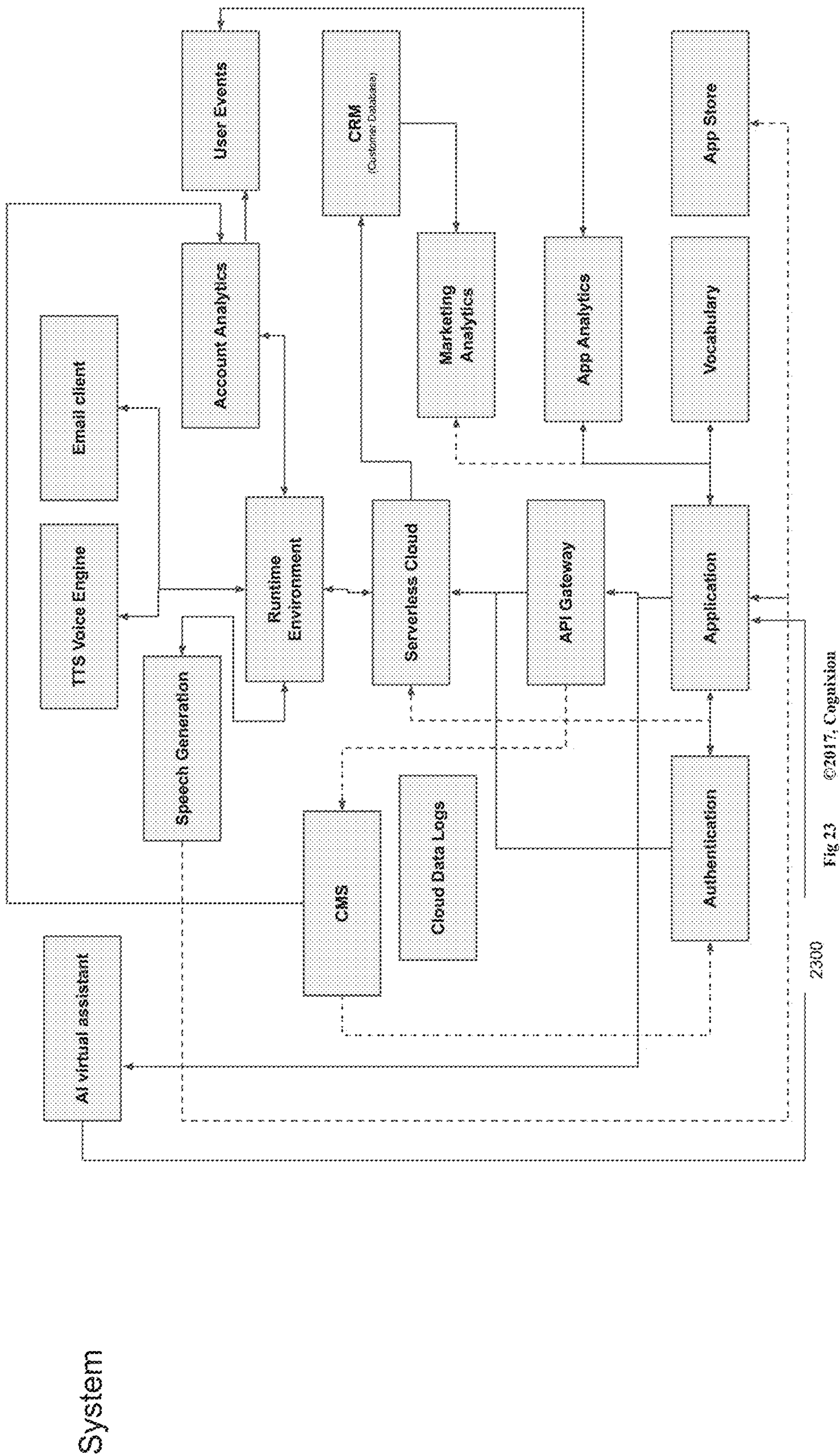
FIG. 23 is a block diagram showing an example of system operations for a nonverbal multi-input and feedback device.

FIG. 23 is a block diagram 2300 showing an example of system operations for a nonverbal multi-input and feedback device such as herein. Diagram 2300 includes: system operation blocks including authentication. This is an example of the complexity of a system operating in the cloud. Everything in this figure is in the cloud, except for the application that is running on the sensory device.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for user intended computer communication based on nonverbal multi-inputs, comprising:

receiving multiple user's inputs detected by the sensor on the sensory device, wherein the user's inputs include one of brainwaves having a time based analog signal with a beginning middle and end, or eyeglances having a time based movement with a beginning middle and end;

translating the user inputs into a user intent signal, wherein translating includes analyzing and categorizing the multiple user's inputs detected based on a prior predetermined library of user inputs and corresponding user intents, and newly received user inputs and user input user intents;

compare the intent signal to an input stored in a database;

identify a graphical image that the intent signal is translated to and a speech command comprising spoken natural language of a selected language that corresponds to the intent signal; the speech command comprises a word spoken natural language for the graphical image that is translated into the selected language;

display the graphical image and generate an audio signal to output the speech command in the selected language on the sensory device; and transmit the translated graphical image and the translated speech command to another device different than the sensor device.

2. The method of claim 1, prior to receiving multiple user's inputs, receiving a user selection of the selected language of various languages in which audio signals of speech commands will be output.

3. The method of claim 1, wherein transmitting the graphical image to another device includes transmitting the translated graphical image and the translated speech command to a communication device located with a second user.

4. The method of claim 1, wherein translating the user inputs into a user intent signal includes analyzing and categorizing the multiple user's inputs detected using a cloud system.

5. The method of claim 1, wherein the translated graphical image cases an action on behalf of the user to be performed on the another device.

6. The method of claim 1, wherein translating the user inputs includes analyzing and categorizing the multiple user's inputs using machine learning based on the prior predetermined library.

7. The method of claim 1, further comprising:

receiving user inputs detected by respective sensors on the additional sensory devices;

comparing the user inputs to inputs stored in the database on the sensory device;

identifying graphical images and speech commands comprising words that correspond to the user inputs; and transmitting the graphical image and speech command to the additional sensory devices.

8. The method of claim 1, wherein the word is the spoken natural language for the graphical image.

9. The method of claim 1, wherein the user's input includes a tap causing the multiple user's inputs to be received by the sensor; and wherein the tap is not compared to the input stored in the database, is not translated to the graphical image.

10. A nonverbal multi-input device for user intended computer communication, comprising:

a sensory device comprising a set of sensors, and a storage medium storing a program having instructions which when executed by a processor will cause the processor to receive multiple user's inputs detected by the sensor on the sensory device, wherein the user's inputs include one of brainwaves having a time based analog signal with a beginning middle and end, or eyeglances having a time based movement with a beginning middle and end;

translate the user inputs into a user intent signal, wherein translating includes analyzing and categorizing the multiple user's inputs detected based on a prior predetermined library of user inputs and corresponding user intents, and newly received user inputs and user input user intents;

compare the user intent signal to an input stored in a database on the sensory device;

identify a graphical image that the user intent signal is translated to; and display the graphical image on the sensory device; and transmit the translated graphical image to another device.

11. The device of claim 10, the program having instructions which when executed by the processor will cause the processor to, prior to receive multiple user's inputs, receive a user selection of the selected language of various languages in which audio signals of speech commands will be output.

12. The device of claim 10, the program having instructions which when executed by the processor will cause the processor to, identify a speech command comprising spoken natural language of a selected language that corresponds to the user intent signal; wherein the speech command comprises a word spoken natural language for the graphical image that is translated into the selected language; and generate an audio signal to output the speech command in the selected language on the sensory device; and transmit the translated speech command to the another device.

13. The device of claim 12, wherein transmitting the graphical image to another device includes transmitting the translated graphical image and the translated speech command to a communication device located with a second user.

14. The device of claim 13, wherein translating the user inputs into a user intent signal includes analyzing and categorizing the multiple user's inputs detected using a cloud system.

15. The device of claim 10, wherein the translated graphical image causes an action on behalf of the user to be performed by the another device.

16. The device of claim 10, wherein translating the user inputs includes analyzing and categorizing the multiple user's inputs using machine learning based on the prior predetermined library.

17. The device of claim 10 including the sensory device and plural additional sensory devices, wherein the sensory device includes instructions for receiving user inputs detected by respective sensors on the additional sensory devices;

comparing the user inputs to inputs stored in the database on the sensory device;

identifying graphical images and speech commands comprising words that correspond to the user inputs; and transmitting the graphical image and speech command to the additional sensory devices.

18. The device of claim 10, wherein the user's input includes a tap causing the multiple user's inputs to be received by the sensor; and wherein the tap is not compared to the input stored in the database, is not translated to the graphical image.

19. A nonverbal multi-input and feedback device for user intended computer control and communication of text and graphics, comprising:

a sensory device comprising a set of sensors, and a local storage medium storing a program having instructions which when executed by a processor will cause the processor to receive multiple user's inputs detected by user preferred sensors, or combined user's inputs of multiple sensors of the set of sensors, wherein the user's inputs include one of: brainwaves having a time based analog signal with a beginning middle and end; eye glances having a time based movement with a beginning middle and end; head or body motion gestures having a time based movement with a beginning, middle and end; physical touch gestures having a time based movement in distinct directions with a beginning, middle and end; or a change in air pressure through inhale or exhale gestures having a time based pattern with a beginning, middle and end;

classify and categorize the user inputs into a user intent signal, wherein classifying and categorizing includes assessing and scoring an intent signal based on its power, duration, state change thresholds, wherein intent signals are mathematically evaluated for quality of intention classification and iterative improve in accuracy removing false positives and false negative outputs compare the intent signal to an input stored in a database to classify the intent signal as a gesture;

execute the gesture to perform at least two of;

displaying text, emoji or visual symbols for the user;

communicating personalized text, emoji or visual symbols to a communication recipient;

storing the gesture in memory for future use;

display the graphical image on the sensory device or a secondary device via a network connection; and transmit the translated graphical image to another device.

20. The device of claim 19, wherein intent signals may be enriched by tagging and appending intent signal with real-time meta data creating an enriched intent signal to be prior predetermined classes and categories of user inputs and corresponding user intents and output parameters, and newly received user inputs and user input user intents; and wherein executing the gesture is based on the configured parameters.

* * * * *